United States Patent
Kato et al.

(10) Patent No.: US 7,496,824 B2
(45) Date of Patent: Feb. 24, 2009

(54) DATA RECORDING DEVICE AND METHOD, DATA REPRODUCTION DEVICE AND METHOD, INFORMATION RECORDING MEDIUM, PROGRAM-CONTAINING MEDIUM, AND PROGRAM

(75) Inventors: Motoki Kato, Kanagawa (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 924 days.

(21) Appl. No.: 10/479,449

(22) PCT Filed: Mar. 27, 2003

(86) PCT No.: PCT/JP03/03796

§ 371 (c)(1),
(2), (4) Date: Dec. 2, 2003

(87) PCT Pub. No.: WO03/083868

PCT Pub. Date: Oct. 9, 2003

(65) Prior Publication Data

US 2004/0153948 A1 Aug. 5, 2004

(30) Foreign Application Priority Data

Apr. 2, 2002 (JP) .............................. 2002-100349

(51) Int. Cl.
*H03M 13/00* (2006.01)

(52) U.S. Cl. ........................ 714/776; 714/758; 714/805; 714/809

(58) Field of Classification Search ................. 714/758, 714/799, 776, 805, 819
See application file for complete search history.

(56) References Cited

U.S. PATENT DOCUMENTS 6,181,679 B1 * 1/2001 Ashton et al. ................ 370/244
6,907,044 B1 * 6/2005 Yonge et al. ................ 370/445
6,968,434 B2 * 11/2005 Kamano et al. ............. 711/163
6,987,770 B1 * 1/2006 Yonge, III .................... 370/401

FOREIGN PATENT DOCUMENTS

| EP | 759617 | 2/1997 |
|---|---|---|
| EP | 903744 | 3/1999 |
| JP | 7-75063 | 3/1995 |
| JP | 07-075063 | 3/1995 |
| JP | 09-065272 | 3/1997 |
| JP | 11-176083 | 7/1999 |
| JP | 11-187354 | 7/1999 |
| JP | 2001-273716 | 7/1999 |
| JP | 2001-273716 | 10/2001 |

* cited by examiner

*Primary Examiner*—Esaw T Abraham
(74) *Attorney, Agent, or Firm*—Oblon, Spivak, McClelland, Maier & Neustadt, P.C.

(57) ABSTRACT

A data-recording/reproducing apparatus and method, that determine a reproduction position with high degree of reliability for data recorded on an information-recording medium even after the data is edited. From a process to edit an AV stream file, a DV data recording/reproducing apparatus splits a DVF-sequence into sequences including consecutive frames. When data is deleted in sector units in the edit process, pieces of data included in deleted frames are left at the beginning and end of each of the sequences. The DV data recording/reproducing apparatus records data representing the length of the data left at the head and the end of the sequences, data representing a frame number assigned to a frame located at the head of the sequences, and data representing the number of frames included in the sequences, on a disc used as the information-recording medium, for example an optical disc.

24 Claims, 25 Drawing Sheets

F I G. 4

| Syntax | No.of bits | Mnemonic |
|---|---|---|
| PlayList() { | | |
|     number_of_PlayItems | 8 | uimsbf |
|     for(I=0;i<number_of_PlayItems;i ++) { | | |
|         PlayItem() | | |
|     } | | |
| } | | |

F I G. 5

| Syntax | No.of bits | Mnemonic |
|---|---|---|
| PlayItem() { | | |
|     Clip_Information_file_name | 8*10 | bslbf |
|     connection_condition | 8 | bslbf |
|     In_time | 32 | uimsbf |
|     OUT_time | 32 | uimsbf |
| } | | |

F I G. 8

| Syntax | No.of bits | Mnemonic |
|---|---|---|
| zzzzz.clpi{ | | |
|     Clip_Info() | | |
|     Sequenceinfo() | | |
|     Programinfo() | | |
| } | | |

F I G. 9

| Syntax | No.of bits | Mnemonic |
|---|---|---|
| ClipInfo() { | | |
|     DV_format_type | 8 | uimsbf |
| } | | |

→ TIME

F I G. 1 2
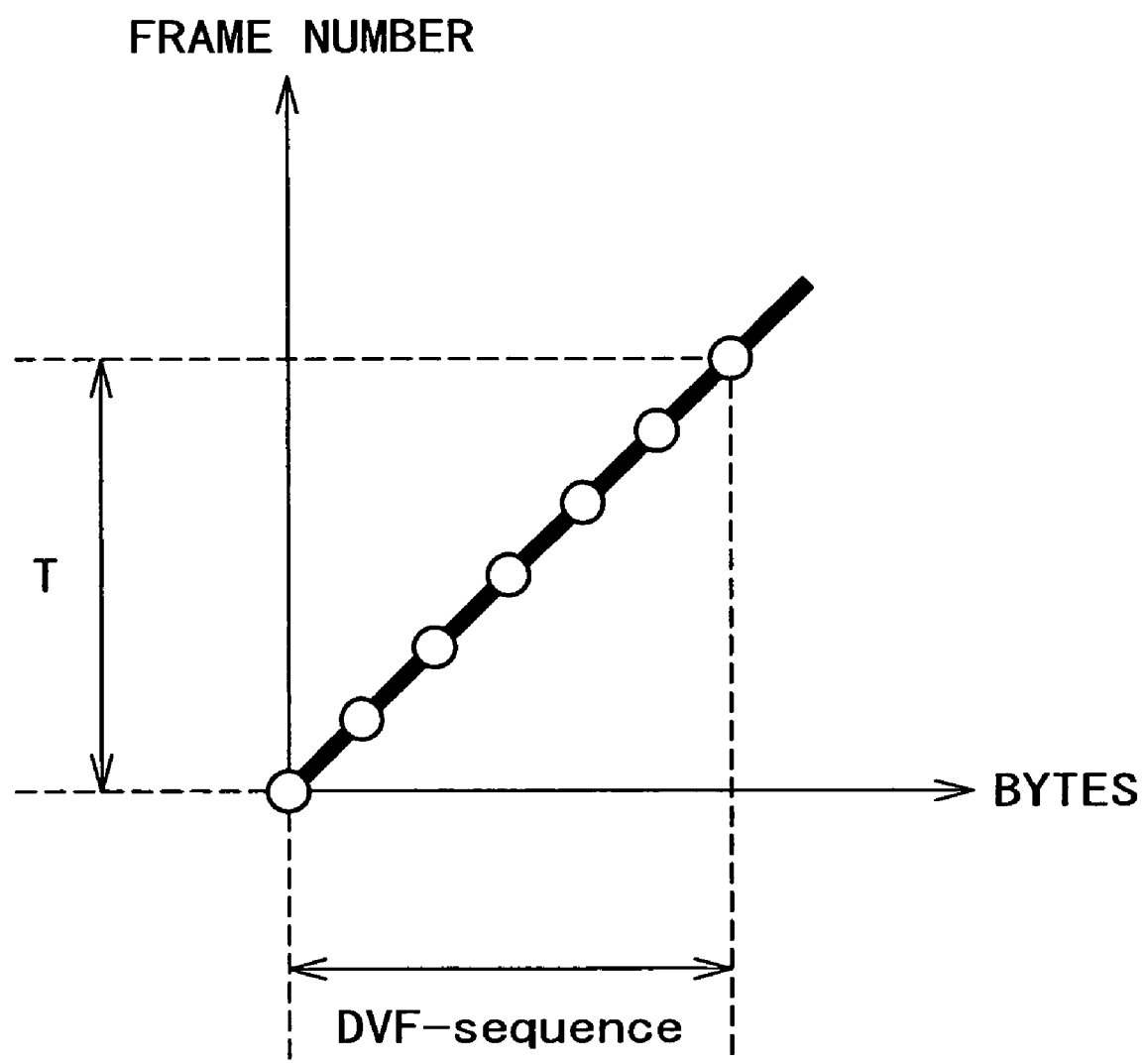

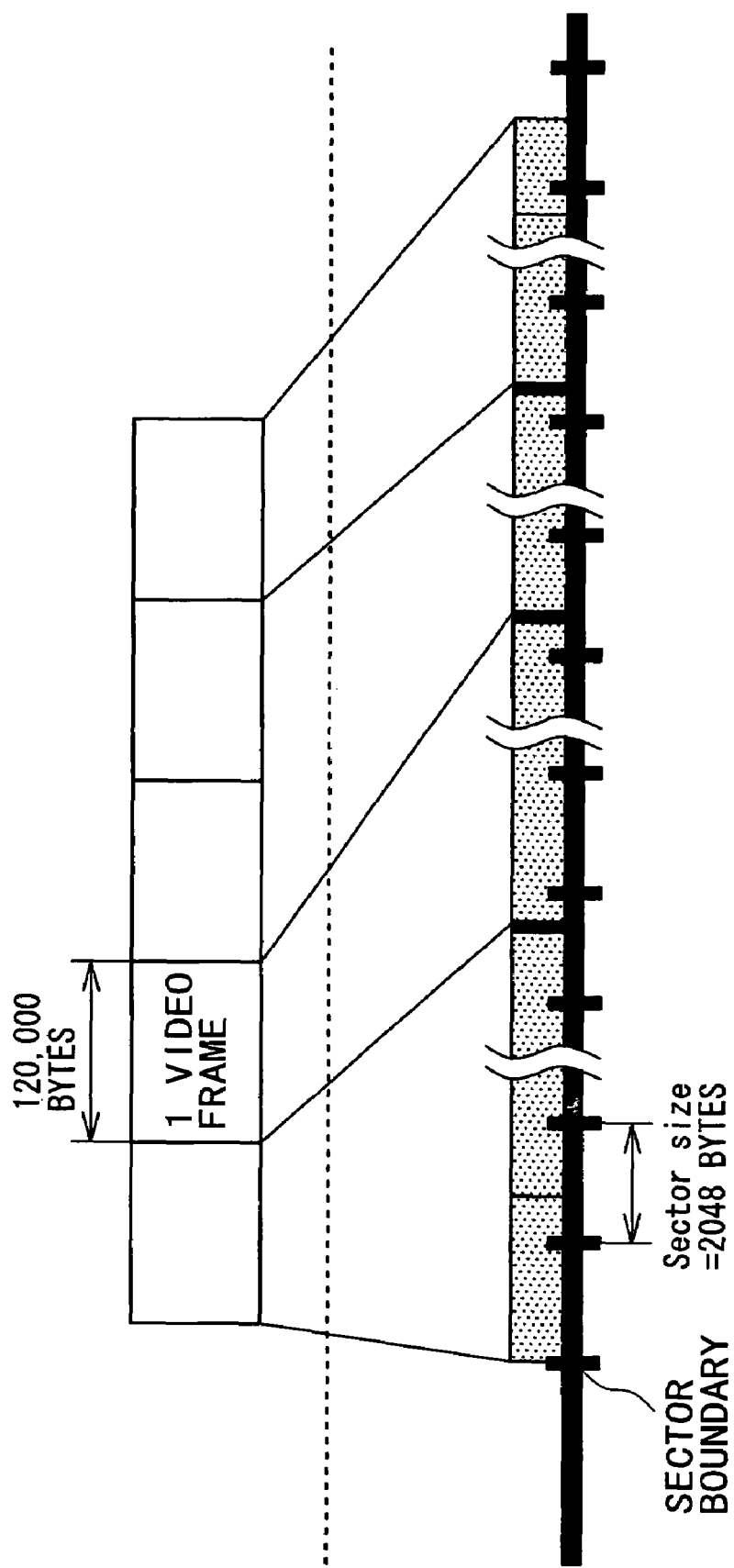

FIG. 20

| Syntax | No. of bits | Mnemonic |
|---|---|---|
| SequenceInfo() { | | |
| num_of_DVF_sequences | 8 | uimsbf |
| for(dvf_id=0;dvf_id<num_of_DVF_sequences;dvf_id++) { | | |
| Offset_FN_DVF[dvf_id] | 32 | uimsbf |
| Number_of_frames[dvf_id] | 32 | uimsbf |
| Leading_data_size[dvf_id] | 32 | uimsbf |
| Trailing_dat_size[dvf_id] | 32 | uimsbf |
| } | | |
| } | | |

FIG. 24

| Syntax | No. of bits | Mnemonic |
|---|---|---|
| ProgramInfo() { | | |
|   num_of_program_sequences | 8 | uimsbf |
|   for(pgm_id=0;pgm_id<num_of_program_sequences;pgm_id++) { | | |
|     N_program_sequence_start[pgm_id] | 32 | uimsbf |
|     audio_mode[pgm_id] | 8 | uimsbf |
|     lock_flag[pgm_id] | 1 | uimsbf |
|     reserved | 7 | uimsbf |
|   } | | |
| } | | |

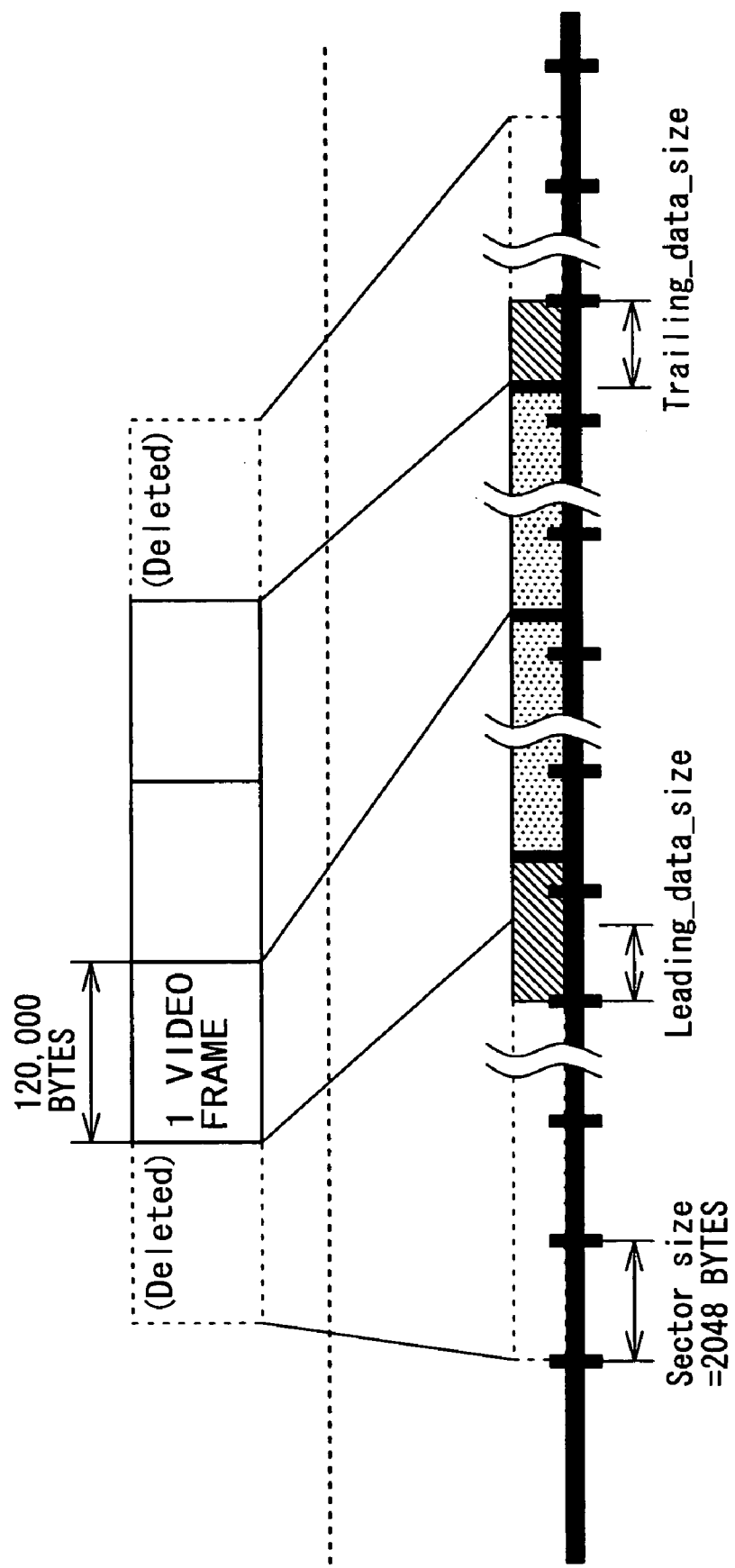

DATA RECORDING DEVICE AND METHOD, DATA REPRODUCTION DEVICE AND METHOD, INFORMATION RECORDING MEDIUM, PROGRAM-CONTAINING MEDIUM, AND PROGRAM

TECHNICAL FIELD

In general, the present invention relates to a data-recording apparatus, a data-recording method, a data reproducing apparatus, a data reproducing method, an information-recording medium, a program storage medium and a program. More particularly, the present invention relates to a data-recording apparatus, a data-recording method, a data reproducing apparatus, a data reproducing method, an information-recording medium, a program storage medium and a program that are each usable as means for determining a reproduction position with a high degree of reliability for data recorded on the information-recording medium even after the data is edited.

BACKGROUND ART

A DV (Digital Video) method is one of high-performance encoding methods for compressing the amount of information conveyed by an AV (Audio Visual) signal. The DV encoding method is disclosed in a document with a title of 'Specification of Consumer-Use Digital VCRs using 6.3 mm magnetic tape' disclosed in an HD DIGITAL VCR CONFERENCE. The DV method is adopted in applications such as a camcoder using a video cassette tape. A camcoder is a video tape recorder integrated with a camera to form a single apparatus.

A DV signal can be input and output by way of an IEEE (Institute of Electrical and Electronic Engineers) 1394 digital interface, which is referred to hereafter simply as an IEEE 1394 I/F. The format of a signal flowing through the IEEE 1394 I/F is shown in FIG. 1.

The IEEE 1394 I/F handles a DV signal in 80-byte block units each known as a DIF (Directory Interchange Format) block. 150 DIF blocks form 1 DIF sequence. A DIF sequence comprises a header section, a subcode section, a VAUX section and an audio & video section. In the case of an SD-DVCR, which is a standard compression mode of a standard TV (television) signal, one video frame comprises 10 DIF sequences in a 525-60 system such as the NTSC (National Television System Committee) or 12 DIF sequences in a 625-60 system such as the PAL (Phase Alternating Line). In the case of an SDL-DVCR, which is a high compression mode of a standard TV (television) signal, on the other hand, one video frame comprises 5 DIF sequences in a 525-60 system or 6 DIF sequences in a 625-50 system.

A DIF block comprises a 3-byte ID (Identifier) located at the beginning of the block and 77-byte data following the ID. The ID includes a DIF block type, a sequence number representing a color sequence, a DIF sequence number and a DIF block number. The DIF block type indicates the type of a section including the block. If a DIF block type indicates a header section, the DIF block with an ID including the DIF block is located at the beginning of a DIF sequence. A DIF block included in a header section has 3 most significant bits of 000 in the first byte thereof.

A DV signal having such a format flows through an IEEE 1394 I/F as isochronous packets. The payload of an isochronous packet conveying a DV signal is referred to as a source packet. A source packet has a fixed length of 6 DIF blocks or 480 bytes.

A relation between a source packet and DIF blocks in the 525-60 system is shown in FIG. 2. All frames of a DV stream are subjected to an intra-frame encoding process to generate frames each having a fixed bit rate (length) of 120,000 bytes. Thus, the number of source packets per video frame is also fixed. That is to say, the number of source packets per video frame in the SD-DVCR mode is 250 for the 525-60 system or 300 for the 625-50 system.

By the way, in recent years, there has been proposed a variety of optical discs as an information-recording medium implemented in the form of a disc that can be dismounted from a recording/reproducing apparatus. Such an optical disc usable for recording data is characterized in that the disc can be used as recording media having a large storage capacity of several gigabytes and allowing a high transfer bit rate of several tens of Mbps. Thus, the optical disc is very much expected to serve as storage media for recording an AV (Audio Visual) such as a video signal. It is anticipated that, in the future, there will be raised a demand for a DV recording/reproducing apparatus for recording a DV signal, which has been recorded on a tape by using a camcoder or the like, onto an optical disc by way of an IEEE 1394 I/F.

As described above, with the storage capacity of a recording medium increasing, the recording medium can be used for storing a large amount of data such as image and sound data of video materials. That is to say, the recording medium can be used for storing a large number of DV video materials. In consequence, there will be required an operation such as an editing work for producing a result, which allows the user to watch desired images selected from those numerous DV video materials recorded on the disc.

When an editing work is carried out, however, there will be raised a problem of a difficulty in speedily identifying an access position in the DV video materials recorded on the disc.

DISCLOSURE OF INVENTION

It is thus an object of the present invention addressing the problem described above to make a fast access to an arbitrary position of data of DV video materials recorded on a recording medium even after the contents of data recorded on the recording medium is edited.

A data-recording apparatus provided by the present invention, including: a control unit for assigning frame array identification information to each of frame arrays each comprising successive frames; and acquiring leading-data information for each of the frame arrays as information representing the length of data located at the beginning of the frame array as a part not belonging to the frame array; acquiring trailing-data information for each of the frame arrays as information representing the length of data located at the end of the frame array as a part not belonging to the frame array; acquiring first information for each of the frame arrays as information for identifying a frame located at the beginning of the frame array; and acquiring second information for each of the frame arrays as information representing the number of frames included in the frame array; and a recording unit for recording the leading-data information, the trailing-data information, the first information and the second information along with the frame array identification information into an information-recording medium by associating the leading-data information, the trailing-data information, the first information and the second information with the frame array identification information.

It is possible to implement the data-recording apparatus as a special-purpose apparatus for carrying out recording operations only or as a block for performing a recording process of an apparatus for carrying out both recording and reproducing operations.

It is possible to implement a configuration in which the top of the leading-data information and the end of the trailing-data information each coincide with a sector boundary.

It is possible to implement a configuration in which video data handled by the data-recording apparatus is data obtained as a result of an intra-frame encoding process carried out on all the frames.

It is possible to implement a configuration in which the video data is video data with all the frames thereof having a uniform amount of data.

It is possible to implement a configuration in which the successive frames are frames having regularly increasing frame numbers assigned thereto.

It is possible to implement a configuration in which the successive frames are frames having regularly increasing reproduction times.

It is possible to implement a configuration in which the first information is an offset number representing a frame number assigned to a frame located at the beginning of the frame array and the second information is the number of frames included in the frame array.

It is possible to implement a configuration in which the first information is a reproduction start frame number representing a frame number assigned to a frame located at the beginning of the frame array and the second information is a reproduction end frame number representing a frame number assigned to a frame located at the end of the frame array.

It is possible to implement a configuration in which the first information is an offset reproduction start time representing a frame located at the beginning of the frame array and the second information is an offset reproduction end time representing a frame located at the end of the frame array.

According to the present invention, a data-recording method including the steps of: assigning frame array identification information to each of frame arrays each comprising successive frames; generating leading-data information for each of the frame arrays as information representing the length of data located at the beginning of the frame array as a part not belonging to the frame array; generating trailing-data information for each of the frame arrays as information representing the length of data located at the end of the frame array as a part not belonging to the frame array; detecting first information for each of the frame arrays as information for identifying a frame located at the beginning of the frame array; and computing second information for each of the frame arrays as information representing the number of frames included in the frame array; and recording the leading-data information, the trailing-data information, the first information and the second information along with the frame array identification information into an information-recording medium by associating the leading-data information, the trailing-data information, the first information and the second information with the frame array identification information.

A first program storage medium provided by the present invention as a program storage medium for storing a program, including the steps of: assigning frame array identification information to each of frame arrays each comprising successive frames; generating leading-data information for each of the frame arrays as information representing the length of data located at the beginning of the frame array as a part not belonging to the frame array; generating trailing-data information for each of the frame arrays as information representing the length of data located at the end of the frame array as a part not belonging to the frame array; detecting first information for each of the frame arrays as information for identifying a frame located at the beginning of the frame array; and computing second information for each of the frame arrays as information representing the number of frames included in the frame array; and recording the leading-data information, the trailing-data information, the first information and the second information along with the frame array identification information into an information-recording medium by associating the leading-data information, the trailing-data information, the first information and the second information with the frame array identification information.

According to the present invention, a first program is executed by a computer to carry out processing, including the steps of: assigning frame array identification information to each of frame arrays each comprising successive frames; generating leading-data information for each of the frame arrays as information representing the length of data located at the beginning of the frame array as a part not belonging to the frame array; generating trailing-data information for each of the frame arrays as information representing the length of data located at the end of the frame array as a part not belonging to the frame array; detecting first information for each of the frame arrays as information for identifying a frame located at the beginning of the frame array; and computing second information for each of the frame arrays as information representing the number of frames included in the frame array; and recording the leading-data information, the trailing-data information, the first information and the second information along with the frame array identification information into an information-recording medium by associating the leading-data information, the trailing-data information, the first information and the second information with the frame array identification information.

A data reproducing apparatus provided by the present invention, including: a reproduction unit for reproducing the following pieces of information from an information-recording medium: frame array identification information for identifying each frame array comprising successive frames; leading-data information representing the length of data located at the beginning of the frame array as a part not belonging to the frame array; trailing-data information representing the length of data located at the end of the frame array as a part not belonging to the frame array; first information for identifying a frame located at the beginning of the frame array; and second information representing the number of frames included in the frame array; and a control unit for controlling a reproduction position of a specified frame on the basis of the frame array identification information, the leading-data information, the trailing-data information, the first information and the second information.

It is possible to provide a configuration in which the top of the leading-data information and the end of the trailing-data information each coincide with a sector boundary.

It is possible to implement the data reproducing apparatus as a special-purpose apparatus for carrying out reproducing operations only or as a block for performing a reproduction process of an apparatus for carrying out both recording and reproducing operations.

It is possible to provide a configuration in which the successive frames are frames having regularly increasing frame numbers assigned thereto.

It is possible to provide a configuration in which the successive frames are frames having regularly increasing reproduction times.

It is possible to provide a configuration in which the first information is an offset number representing a frame number assigned to a frame located at the beginning of the frame array and the second information is the number of frames included in the frame array.

It is possible to provide a configuration in which the amount of data included in any of the frames is uniform for all the frames and the control unit computes the reproduction position of the specified frame by executing the steps of: computing a difference between a specified-frame identification number used for specifying the specified frame and the offset number of a specific frame array including the specified frame; multiplying the difference by the uniform amount of data in order to result in a product; and adding the product to a sum of the leading-data information for the specific frame array and the amount of data included in a previous frame array immediately preceding the specific frame array on a time base in order to result in the reproduction position.

It is possible to provide a configuration in which the control unit computes the amount of data included in the previous frame array immediately preceding the specific frame array on a time base by executing the steps of: multiplying the uniform amount of data by the number of frames included in the previous frame array in order to result in a product; and adding the product to a sum of the leading-data information of the previous frame array and the trailing-data information of the previous frame array in order to result in the amount of data included in the previous frame array.

It is possible to provide a configuration in which the first information is a reproduction start frame number representing a frame number assigned to a frame located at the beginning of the frame array and the second information is a reproduction end frame number representing a frame number assigned to a frame located at the end of the frame array.

It is possible to provide a configuration in which the amount of data included in any of the frames is uniform for all the frames and the control unit computes the reproduction position of the specified frame by executing the steps of: computing a difference between a specified-frame identification number used for specifying the specified frame and the first information representing the reproduction start frame number of a specific frame array including the specified frame; multiplying the difference by the uniform amount of data in order to result in a product; and adding the product to a sum of the leading-data information for the specific frame array and the amount of data included in a previous frame array immediately preceding the specific frame array on a time base in order to result in the reproduction position.

It is possible to provide a configuration in which the control unit computes the amount of data included in the previous frame array immediately preceding the specific frame array on a time base by executing the steps of: computing a difference between the reproduction end frame number of the previous frame array and the reproduction start frame number of the previous frame array in order to result in the number of frames included in the previous frame array; multiplying the uniform amount of data by the difference in order to result in a product; and adding the product to a sum of the leading-data information of the previous frame array and the trailing-data information of the previous frame array in order to result in the amount of data included in the previous frame array.

It is possible to provide a configuration in which the first information is an offset reproduction start time representing a frame located at the beginning of the frame array and the second information is an offset reproduction end time representing a frame located at the end of the frame array.

It is possible to provide a configuration in which the amount of data included in any of the frames is uniform for all the frames and the control unit computes the reproduction position of the specified frame by executing the steps of: computing a difference between a specified-frame identification number used for specifying the specified frame and the first information representing the offset reproduction start time of a specific frame array including the specified frame; multiplying the difference by the uniform amount of data in order to result in a product; and adding the product to a sum of the leading-data information for the specific frame array and the amount of data included in a previous frame array immediately preceding the specific frame array on a time base in order to result in the reproduction position.

It is possible to provide a configuration in which the control unit computes the amount of data included in the previous frame array by executing the steps of: computing a difference between the offset reproduction end time of the previous frame array and the first information representing the offset reproduction start time of the previous frame array in order to result in the number of frames included in the previous frame array; multiplying the uniform amount of data by the difference in order to result in a product; and adding the product to a sum of the leading-data information of the previous frame array and the trailing-data information of the previous frame array in order to result in the amount of data included in the previous frame array.

A data reproducing method provided by the present invention including the steps of: reproducing frame array identification information for identifying each frame array comprising successive frames from an information-recording medium; reproducing leading-data information representing the length of data located at the beginning of the frame array as a part not belonging to the frame array from the information-recording medium; reproducing trailing-data information representing the length of data located at the end of the frame array as a part not belonging to the frame array from the information-recording medium; reproducing first information for identifying a frame located at the beginning of the frame array from the information-recording medium; reproducing second information representing the number of frames included in the frame array from the information-recording medium; and controlling a reproduction position of a specified frame on the basis of the frame array identification information, the leading-data information, the trailing-data information, the first information and the second information.

A second program storage medium provided by the present invention as a program storage medium for storing a program, including the steps of: reproducing frame array identification information for identifying each frame array comprising successive frames from an information-recording medium; reproducing leading-data information representing the length of data located at the beginning of the frame array as a part not belonging to the frame array from the information-recording medium; reproducing trailing-data information representing the length of data located at the end of the frame array as a part not belonging to the frame array from the information-recording medium; reproducing first information for identifying a frame located at the beginning of the frame array from the information-recording medium; reproducing second information representing the number of frames included in the frame array from the information-recording medium; and controlling a reproduction position of a specified frame on the basis of the frame array identification information, the leading-data information, the trailing-data information, the first information and the second information.

According to the present invention, a second program which is executed by a computer to carry out processing including the steps of: reproducing frame array identification information for identifying each frame array comprising successive frames from an information-recording medium; reproducing leading-data information representing the length of data located at the beginning of the frame array as a part not belonging to the frame array from the information-recording medium; reproducing trailing-data information representing the length of data located at the end of the frame array as a part not belonging to the frame array from the information-recording medium; reproducing first information for identifying a frame located at the beginning of the frame array from the information-recording medium; reproducing second information representing the number of frames included in the frame array from the information-recording medium; and controlling a reproduction position of a specified frame on the basis of the frame array identification information, the leading-data information, the trailing-data information, the first information and the second information.

An information-recording medium provided by the present invention that is used for storing: frame array identification information for identifying each frame array comprising successive frames; leading-data information representing the length of data located at the beginning of the frame array as a part not belonging to the frame array; trailing-data information representing the length of data located at the end of the frame array as a part not belonging to the frame array; first information for identifying a frame located at the beginning of the frame array; and second information representing the number of frames included in the frame array.

With the data-recording apparatus, the data-recording method, the first program storage medium and the first program, which are provided by the present invention, processing is carried out to execute the steps of: assigning frame array identification information to each of frame arrays each comprising successive frames; generating leading-data information for each of the frame arrays as information representing the length of data located at the beginning of the frame array as a part not belonging to the frame array; generating trailing-data information for each of the frame arrays as information representing the length of data located at the end of the frame array as a part not belonging to the frame array; detecting first information for each of the frame arrays as information for identifying a frame located at the beginning of the frame array; and computing second information for each of the frame arrays as information representing the number of frames included in the frame array; and recording the leading-data information, the trailing-data information, the first information and the second information along with the frame array identification information into an information-recording medium by associating the leading-data information, the trailing-data information, the first information and the second information with the frame array identification information.

With the data reproducing apparatus, the data reproducing method, the second program storage medium and the second program, which are provided by the present invention, processing is carried out to execute the steps of: reproducing frame array identification information for identifying each frame array comprising successive frames from an information-recording medium; reproducing leading-data information representing the length of data located at the beginning of the frame array as a part not belonging to the frame array from the information-recording medium; reproducing trailing-data information representing the length of data located at the end of the frame array as a part not belonging to the frame array from the information-recording medium; reproducing first information for identifying a frame located at the beginning of the frame array from the information-recording medium; reproducing second information representing the number of frames included in the frame array from the information-recording medium; and controlling a reproduction position of a specified frame on the basis of the frame array identification information, the leading-data information, the trailing-data information, the first information and the second information.

The information-recording medium provided by the present invention is used for storing: frame array identification information for identifying each frame array comprising successive frames; leading-data information representing the length of data located at the beginning of the frame array as a part not belonging to the frame array; trailing-data information representing the length of data located at the end of the frame array as a part not belonging to the frame array; first information for identifying a frame located at the beginning of the frame array; and second information representing the number of frames included in the frame array.

BRIEF DESCRIPTION OF DRAWINGS

FIG. 4 is a diagram showing the syntax of PlayList ( );

FIG. 5 is a diagram showing the syntax of PlayItem ( );

FIG. 8 is a diagram showing the syntax of the Clip information file;

FIG. 9 is a diagram showing the syntax of ClipInfo ( ) of the syntax shown in FIG. 8;

FIG. 12 is an explanatory diagram showing a DVF-sequence;

FIG. 13 is an explanatory diagram showing a data layout on a disc of a Clip AV stream file created when newly recording the DV stream onto a recording medium;

FIG. 20 is a diagram showing the syntax of Sequence Info ( );

FIG. 24 is a diagram showing the syntax of Program Info ( );

FIG. 31 is an explanatory diagram referred to in describing a case in which the amount of data included in a leading portion of a DVF-sequence resulting from an operation to delete partial data from the Clip AV stream file shown in FIG. 13 exceeds the length of a sector.

BEST MODE FOR CARRYING OUT THE INVENTION

Figure 3:
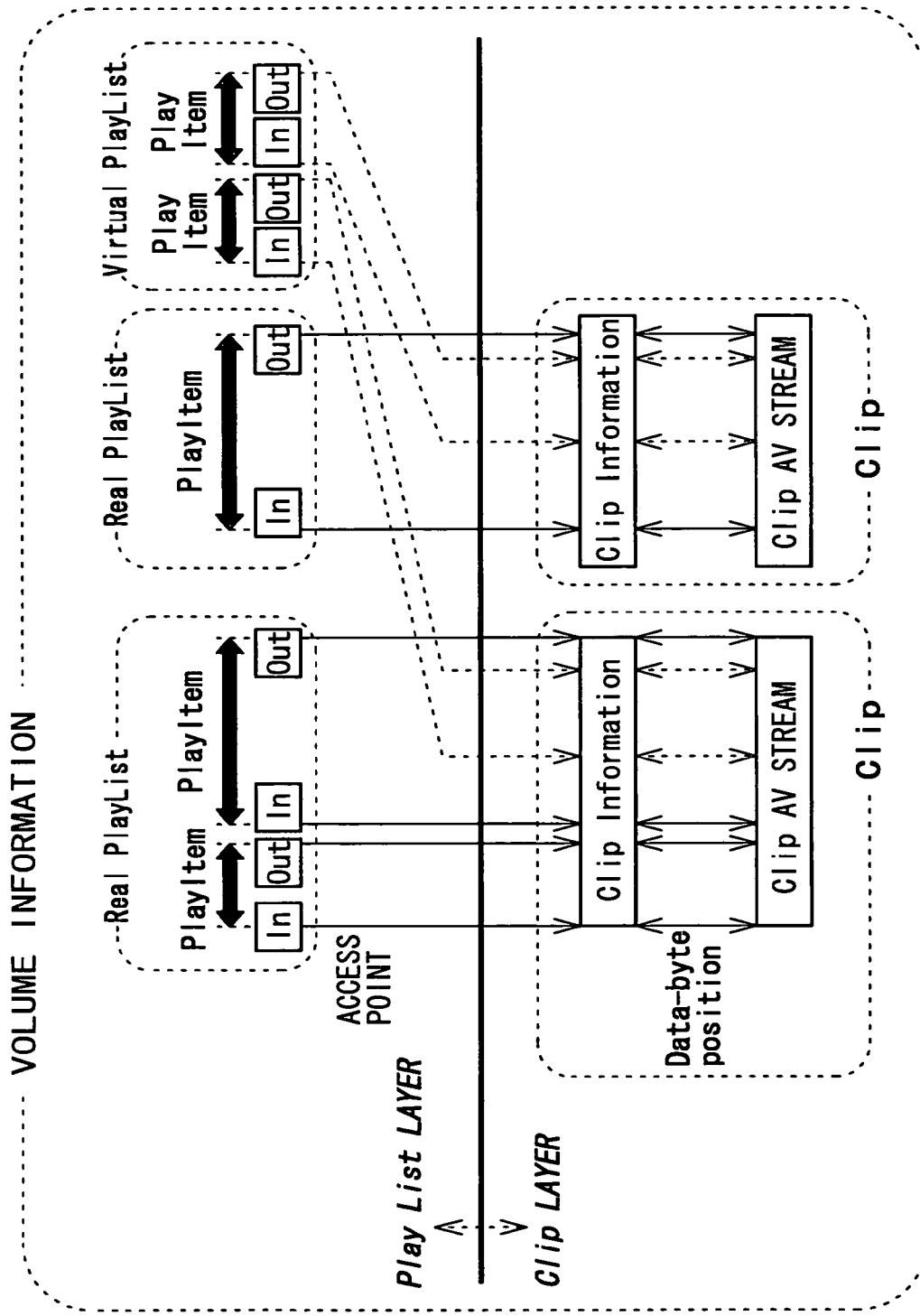
FIG. 3 is a diagram showing a simplified structure of an application format on a recording medium employed in a recording/reproducing system.

FIG. 3 is a diagram showing a simplified structure of an application format on a recording medium (or a recording medium 10 shown in FIG. 27 to be described later). The format has two layers, namely, Clip and Playlist layers for managing an AV stream. Volume information is used for managing all Clip and Playlist objects on a disc.

A pair of an AV stream file and affiliated information thereof is handled as a Clip object. A Clip AV stream file is the AV stream file and a Clip information file is a file containing the affiliated information of the AV stream file.

A Clip AV stream file is used for storing data obtained as a result of laying out a DV stream in a structure prescribed in accordance with a DVR (Digital Video Recording) application format.

In general, a data file used in a computer or the like is handled as an array of bytes. However, a content of a Clip AV stream is spread along the time base and Playlist specifies an access point in Clip mainly as a timestamp. If PlayList gives a timestamp of an access point in Clip, the Clip information file is useful for finding an address in a CLIP AV stream file as an address at which a decoding process is to be started.

PlayList can be used to select reproduction sections, which the user wants to watch, from those included in Clip and allow the selected reproduction sections to be edited with ease. A PlayList object is a collection of reproduction sections selected from Clip. A reproduction section included in a certain Clip object is referred to as PlayItem. PlayItem is represented by a pair of an IN point and an OUT point, which exist on the time base. Thus, PlayList is a collection of PlayItem objects.

There are two PlayList types, namely, Real PlayList and Virtual PlayList.

Real PlayList is PlayList including PlayItem objects sharing a Clip object referenced by PlayList. That is to say, Real PlayList occupies a disc area with a data storage capacity corresponding to the stream portions of Clip referenced by PlayList. When an AV stream is recorded as a new Clip object, Real PlayList referencing the entire reproducible range of the new Clip object is automatically generated. If a portion of the reproducible range of Real PlayList is erased, data of a Clip stream portion referenced by the erased portion of the reproducible range of Real PlayList is also deleted.

Virtual PlayList is PlayList including PlayItem objects sharing no Clip object. Even if Virtual PlayList is modified or deleted, no changes are made to Clip objects referenced by Virtual PlayList.

It is to be noted that, in the following description, Real PlayList and Virtual PlayList are referred to simply as PlayList, a generic name given to both.

FIG. 4 is a diagram showing the syntax of PlayList ( ) stored in a PlayList file. number_of_PlayItems is the number of PlayItem objects included in PlayList.

FIG. 5 is a diagram showing the syntax of PlayItem ( ). Clip_Information_file_name is the name of a File Information file referenced by PlayItem.

connection_condition is information indicating whether or not current PlayItem is connected seamlessly to preceding PlayItem.

IN_time is the number of a frame read out at the start time of an operation to reproduce PlayItem.

OUT_time is the number of a frame read out at the end time of an operation to reproduce PlayItem.

DV frames referenced by IN_time and OUT_time exist on the same DVF-sequence.

Directories necessary in a DVR disc are organized as follows. The top directory is a root directory including a DVR directory. The DVR directory further includes PLAYLIST, CLIPINF and STREAM directories.

Figure 6:
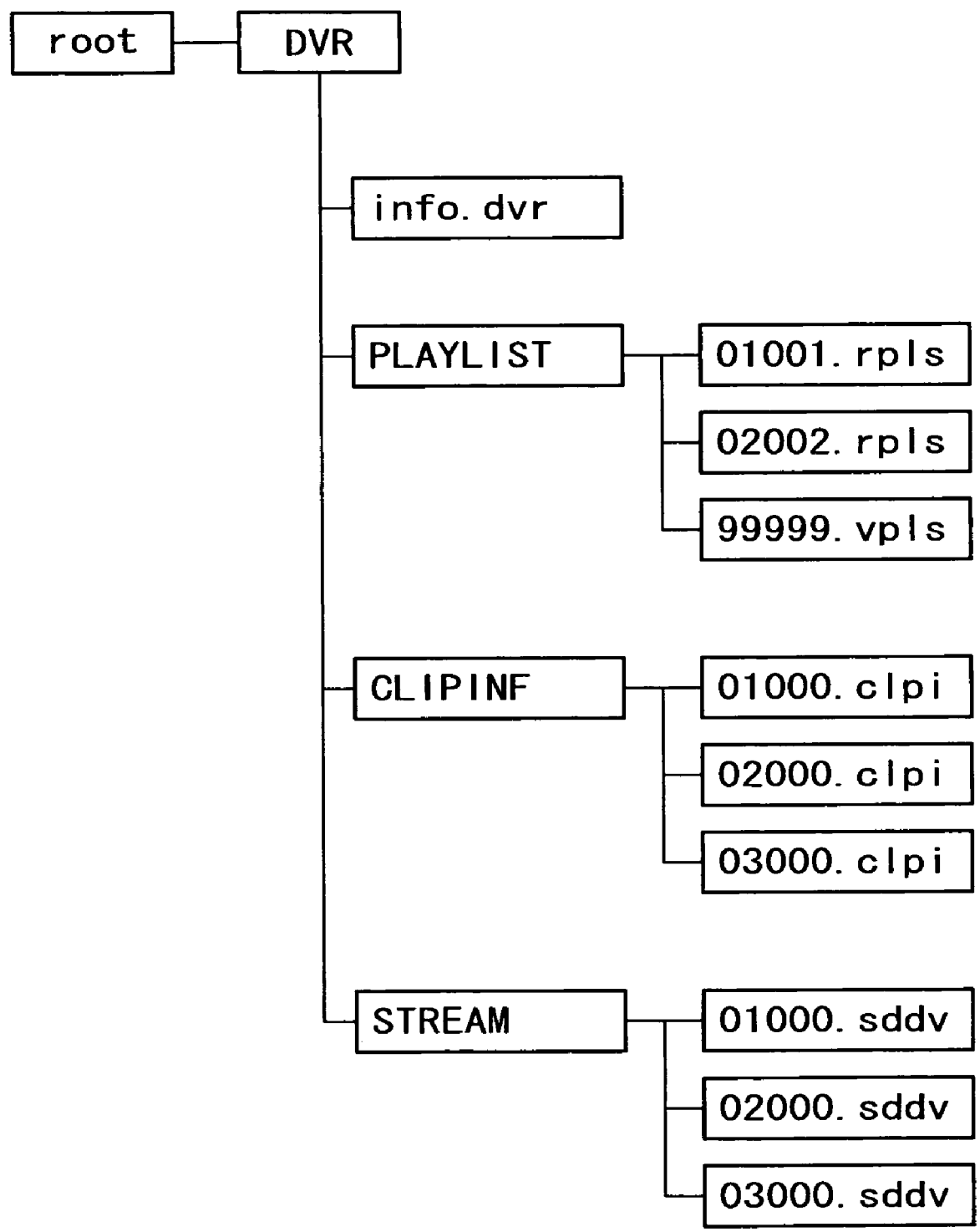
FIG. 6 is a diagram showing a typical structure of directories on a DVR disc.

FIG. 6 is a diagram showing a typical structure of directories on a DVR disc. In this typical structure, the root directory includes only one directory, namely, the DVR directory.

The DVR directory accommodates all files prescribed in the DVR application format and other directories.

The other directories included in the DVR directory are described as follows:

The PLAYLIST directory accommodates database files for storing Real PlayList and Virtual PlayList objects.

The CLIPINF directory accommodates Clip Information database files.

The STREAM directory accommodates AV stream files.

The PLAYLIST directory accommodates two types of PlayList file, namely, Real PlayList and Virtual PlayList files.

A file named xxxxx.rpls is used for storing information related to a Real PlayList object. That is to say, a file named xxxxx.rpls is provided for each Real PlayList. 'xxxxx' of the file name is 5 numerical digits each having a value in the range 0 to 9. 'rpls' is the extension of the file name.

A file named yyyyy.vpls is used for storing information related to a Virtual PlayList object. That is to say, a file named yyyyy.vpls is provided for each Virtual PlayList. 'yyyyy' of the file name is 5 numerical digits each having a value in the range 0 to 9. 'vpls' is the extension of the file name.

The CLIPINF directory accommodates Clip information files each associated with an AV stream file accommodated in the STREAM directory. An AV stream file associated with a Clip information file named zzzzz.clpi is a CLIP AV stream file or a Bridge-Clip AV stream file. 'zzzzz' of the file name is 5 numerical digits each having a value in the range 0 to 9. 'clpi' is the extension of the file name.

The STREAM directory accommodates AV stream files each named zzzzz.sddv. An AV stream file is a file handled by a DVR system. As described above, an AV stream file is a CLIP AV stream file or a Bridge-Clip AV stream file. 'zzzzz' of the file name is 5 numerical digits each having a value in the range 0 to 9. 'sddv' is the extension of the file name.

It is thus possible to use as many AV stream files and as many Clip information files associated with their respective AV stream files as indicated by the 5-digit number 'zzzzz'.

Figure 7:
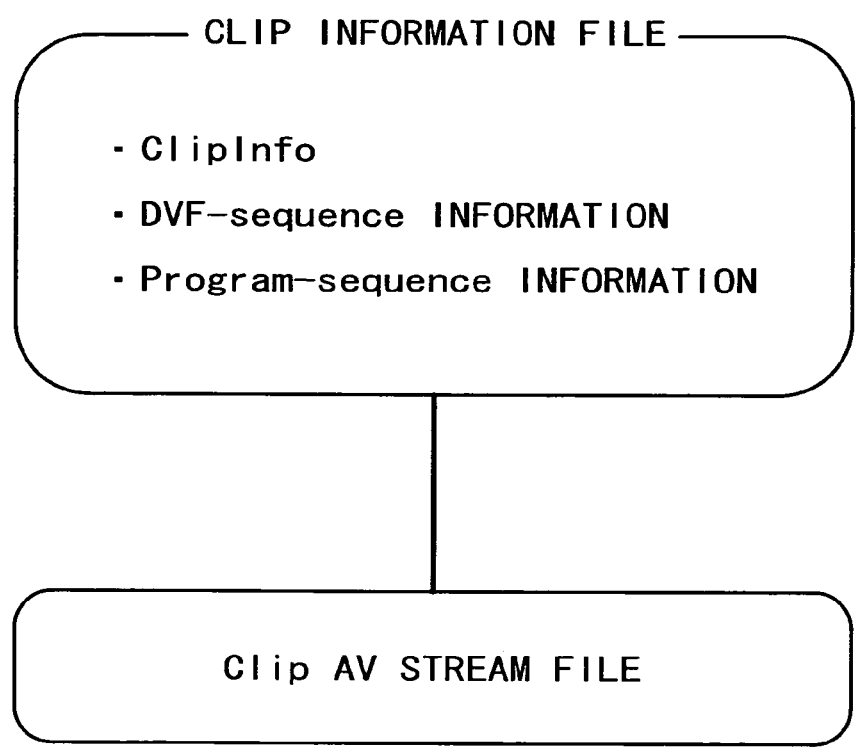
FIG. 7 is a diagram showing a relation between a Clip information file and a Clip AV stream file.

FIG. 7 is a diagram showing a relation between a Clip information file and a Clip AV stream file. A Clip information file is a database file for managing data contained in a Clip AV stream file associated with the Clip information file and time base information on the AV stream stored in the Clip AV stream file. To put it in detail, the Clip information file contains ClipInfo for managing the data contained in the Clip AV stream file, Program-sequence information and DVF-sequence information for managing the time base information on the AV stream.

FIG. 8 is a diagram showing the syntax of the Clip information file. As shown in the ,, this Clip information file contains ClipInfo ( ), SequenceInfo ( ) and ProgramInfo ( ).

FIG. 9 is a diagram showing the syntax of ClipInfo ( ). DV_format_type is the type of DV_format of an AV stream file associated with this Clip. From DV_format_type, it is possible to know the number of data bytes included in 1 DV stream. DV_format_type may indicate an SD-DVCR 525-60 system with a byte count of 120,000 bytes, an SD-DVCR 625-50 system with a byte count of 144,000 bytes, an SDL-DVCR 525-60 system with a byte count of 60,000 bytes or an SDL-DVCR 625-50 system with a byte count of 72,000 bytes.

Figure 1:
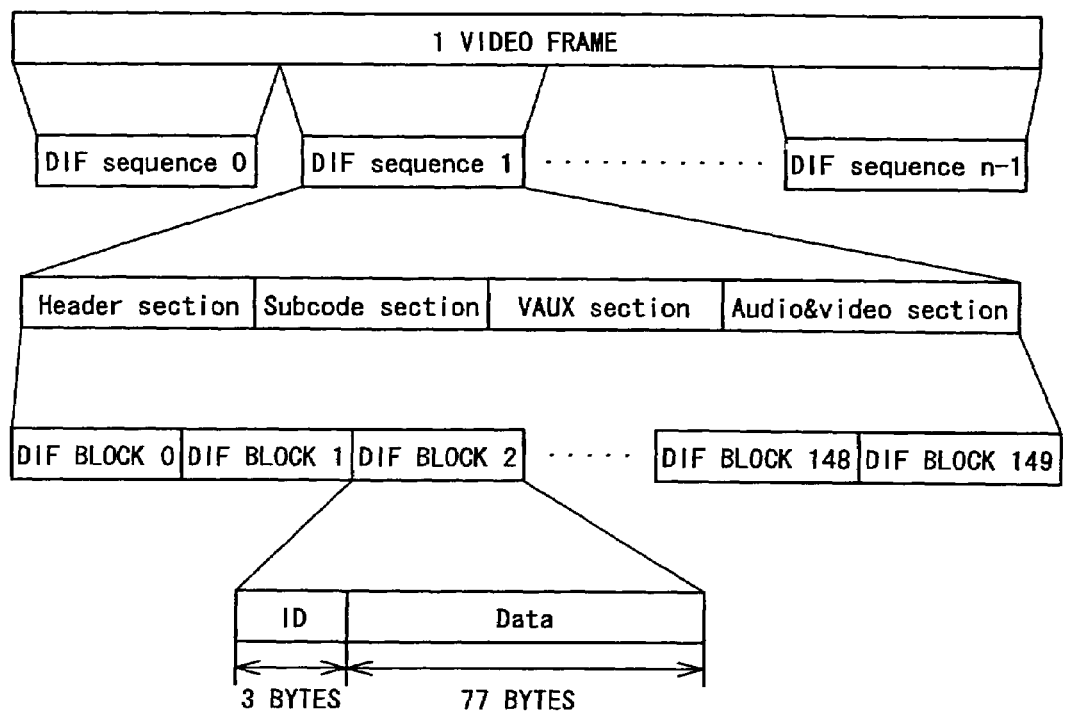
FIG. 1 is a diagram showing the structure of data of a video frame transmitted by way of an IEEE 1394 by adoption of the conventional DV method.
Figure 2:
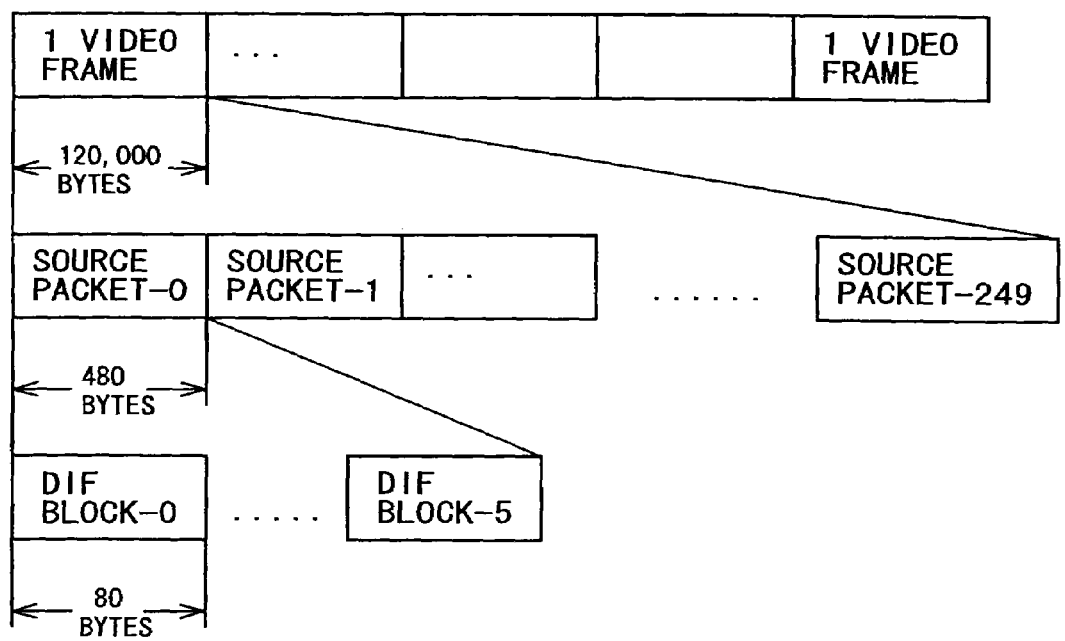
FIG. 2 is a diagram showing a relation between a source packet transmitted by way of the conventional IEEE 1394 and DIF blocks.

Next, the structure of an AV stream file is explained. An AV stream file is recorded with 1 video frame of a DV signal format taken as a unit as shown in FIG. 2. The DV signal format is the format of a DV signal flowing through an IEEE 1394 I/F.

Figure 10:
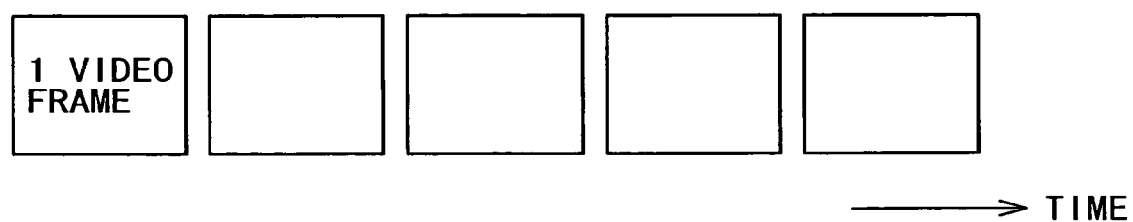
FIG. 10 is an explanatory diagram showing a DV stream, which is input as a stream to be newly recorded onto a recording medium.
Figure 11:
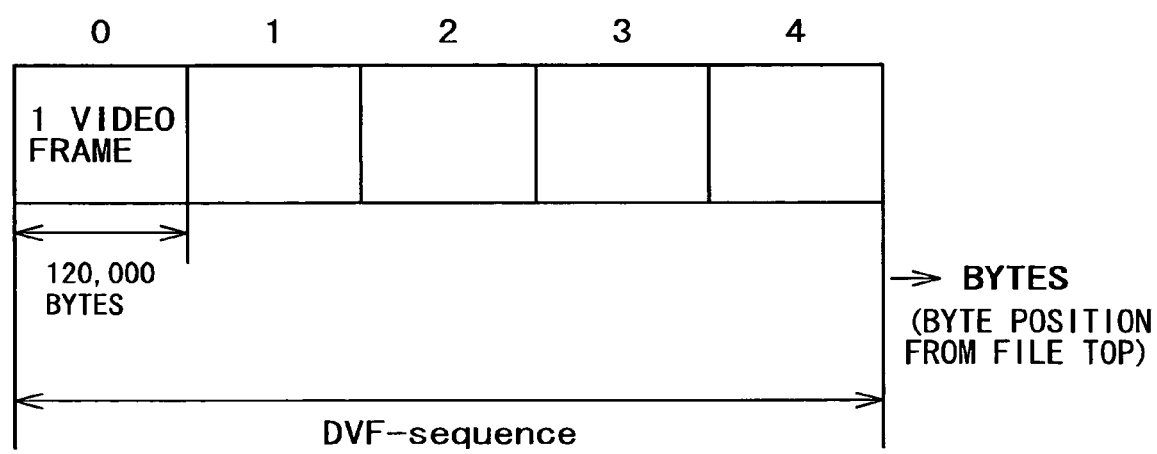
FIG. 11 is an explanatory diagram showing the structure of a Clip AV stream file created when newly recording the DV stream onto a recording medium shown in FIG. 10.

As shown in FIG. 10, a DV stream is input in frame units. If the DV stream is to be newly recorded onto a recording medium, as shown in FIG. 11, pieces of data of the input DV frames are squeezed sequentially in an AV stream file. Logically, the DV stream is recorded in the AV stream file as a continuous array of bytes. In the example shown in the figure, the DV stream is recorded in the AV stream file as an array of bytes composing frames with frame numbers 0, 1, 2, 3 and 4.

FIG. 12 is an explanatory diagram referred to in describing the DVF sequence shown in FIG. 11. The horizontal axis represents byte positions starting with the byte position at the beginning of the file. On the other hand, the vertical axis represents frame numbers. Assume that the DV stream is newly recorded on a recording medium as shown in FIGS. 10 and 11. In this case, frame numbers are assigned to frames of the DV stream sequentially in the order the frames are recorded into the AV stream file as shown in FIG. 12. An array of bytes composing DV frames with regularly increasing frame numbers assigned thereto in an AV stream file is referred to as a DVF-sequence. In the case of the example shown in FIG. 11, the array of bytes composing 5 frames with regularly increasing frame numbers of 0 to 4 assigned thereto forms one DVF-sequence. That is to say, in the period T of one DVF-sequence, the frame numbers assigned to the frames composing the DVF-sequence are regularly increasing numbers. If the DV stream is newly recorded on a recording medium, Clip for the stream has only one DVF-sequence, including no point of discontinuity in the series of regularly increasing DV frame numbers.

The following description explains a layout of data on a recording medium containing 1 DVF-sequence obtained as a result of an operation to newly record the AV stream file described above onto the recording medium. Since data is recorded onto and reproduced from disc media in logical-block units each known as a sector unit, a file system including a general FAT (File Allocation Table) and an UDF (Universal Disk Format) is updated with a logical block taken as a unit to accompany the recording and reproducing operations. It is thus necessary to record and reproduce a DV stream in units, which are each a multiple of a sector. In the case of the UDF, the size of 1 sector is 2,048 bytes. Thus, in an operation to newly record an AV stream file onto a disc, the top of the DVF-sequence is aligned to a sector boundary as shown in FIG. 13. The upper portion of FIG. 13 shows the DVF-sequence for the newly recorded AV stream file and the lower portion of FIG. 13 shows a typical layout of data recorded on the recording medium in the recording operation.

Figure 14:
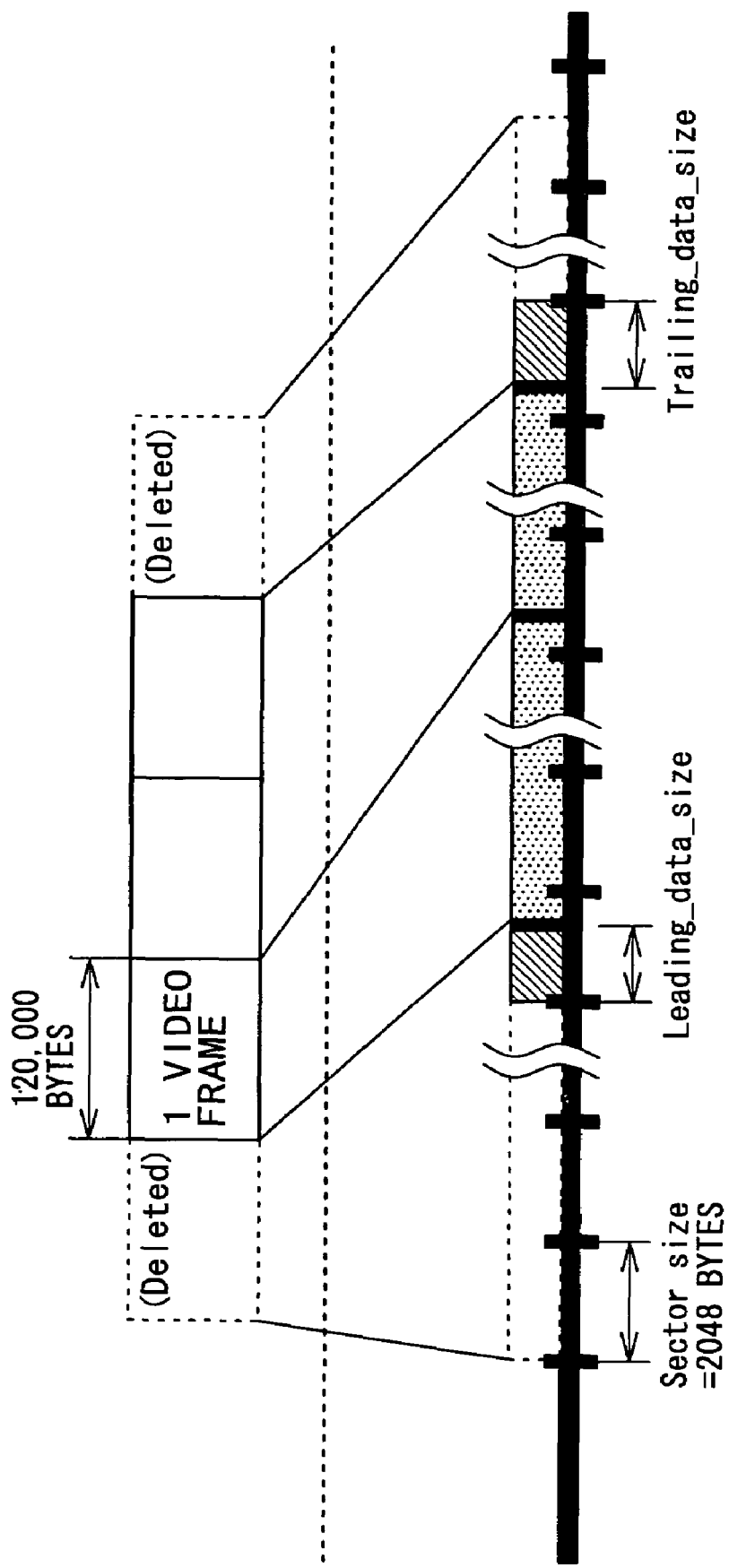
FIG. 14 is an explanatory diagram showing a data layout on a disc as a data layout obtained resulting from an operation to delete partial data from the Clip AV stream shown in FIG. 13.

FIG. 14 is a diagram showing a layout of data recorded on the disc after an operation to partially delete frames of the data from the beginning and the end of the DVF-sequence shown in FIG. 13. In the data-deleting operation, the data is deleted from the beginning of the DVF-sequence in such a way that the top of the resulting DVF-sequence is aligned to a sector boundary. (It is to be noted that data is deleted in sector units.) Since the top of the resulting DVF-sequence is aligned to a sector boundary, data of an incomplete frame data referred to as Leading_data_size precedes the first complete DV frame. By the same token, the data of the rear frame is deleted from the end of the DVF-sequence in such a way that the end of the resulting DVF-sequence is aligned to a sector boundary. Since the end of the resulting DVF-sequence is aligned to a sector boundary, data of an incomplete frame data referred to as Trailing_data_size succeeds the last complete DV frame.

The following description explains a case in which a plurality of DVF-sequences results in an AV stream file.

Figure 15:
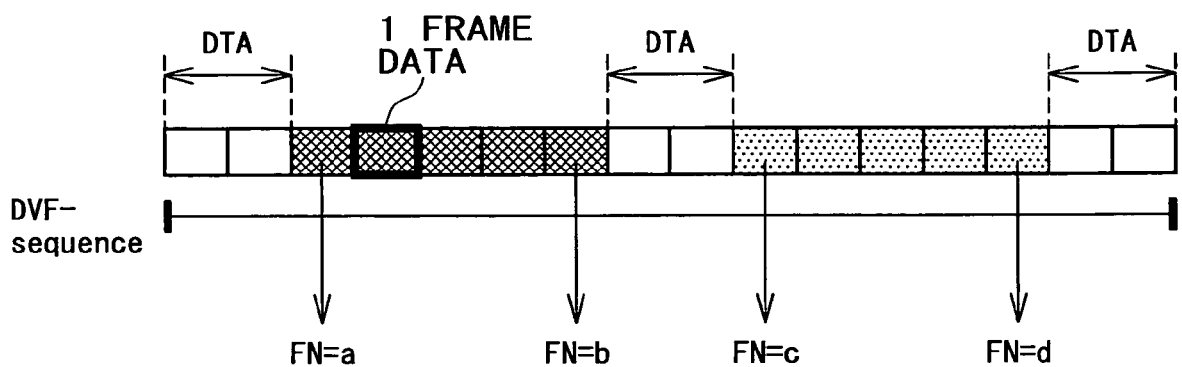
FIG. 15 is an explanatory diagram showing a DVF-sequence obtained as a result of an operation to newly record a DV stream onto a recording medium.
Figure 16:
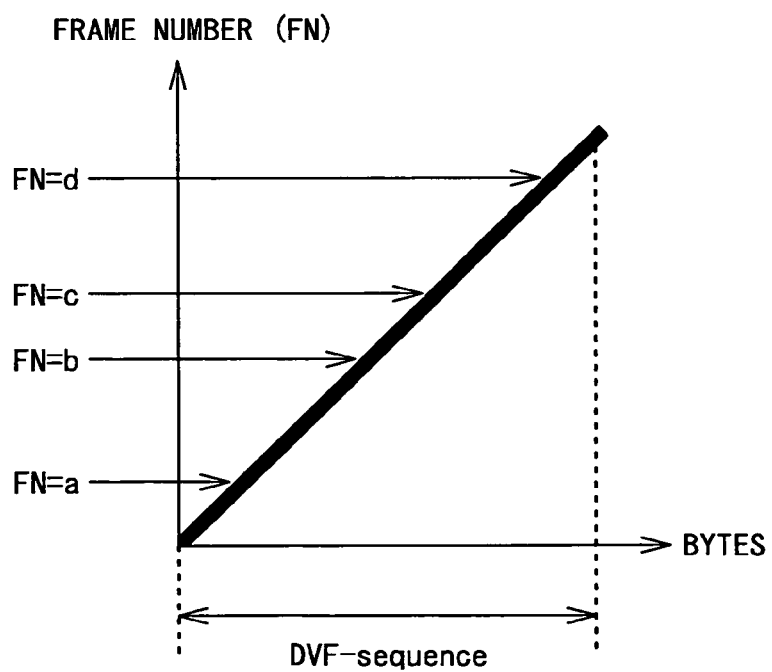
FIG. 16 is an explanatory diagram showing a relation between frame numbers and a DVF-sequence obtained as a result of an operation to newly record the DV stream shown in FIG. 15 onto a recording medium.

FIG. 15 is a diagram showing a DVF-sequence obtained as a result of an operation to newly record a DV stream onto a recording medium. Consider a case in which an operation is carried out to delete data of unnecessary reproduction sections, leaving a reproduction section starting with a frame having a frame number FN=a and ending with a frame having a frame number FN=b as well as a reproduction section starting with a frame having a frame number FN=c and ending with a frame having a frame number FN=d. FIG. 16 is a diagram showing a pre-deletion (pre-editing) relation between the positions of bytes in the DVF-sequence shown in FIG. 15 and the frame numbers (FNs) assigned to frames composing the DVF-sequence. FIG. 16 is similar to FIG. 12. In this case, the frame number (FN) of the DVF-sequence is proportional to the byte count.

Figure 17:
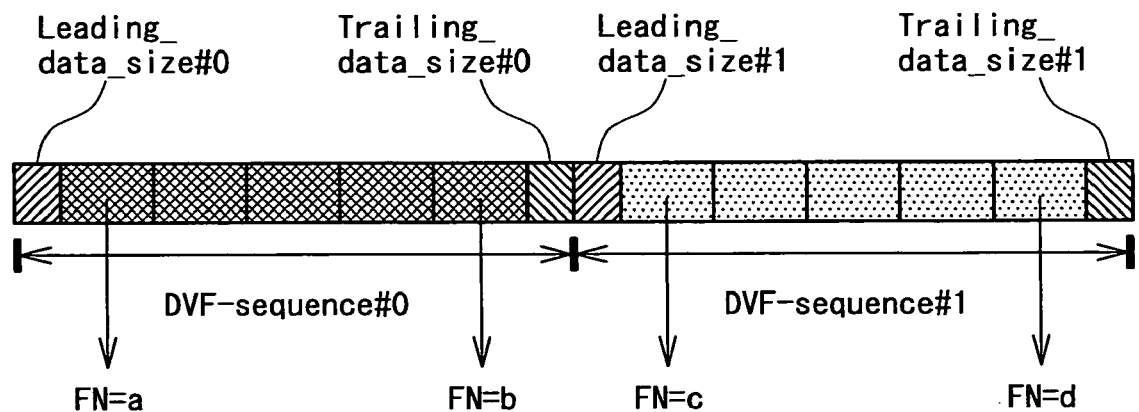
FIG. 17 is an explanatory diagram showing DVF-sequences obtained as a result of an operation to delete a portion of the DVF sequence shown in FIG. 15.
Figure 18:
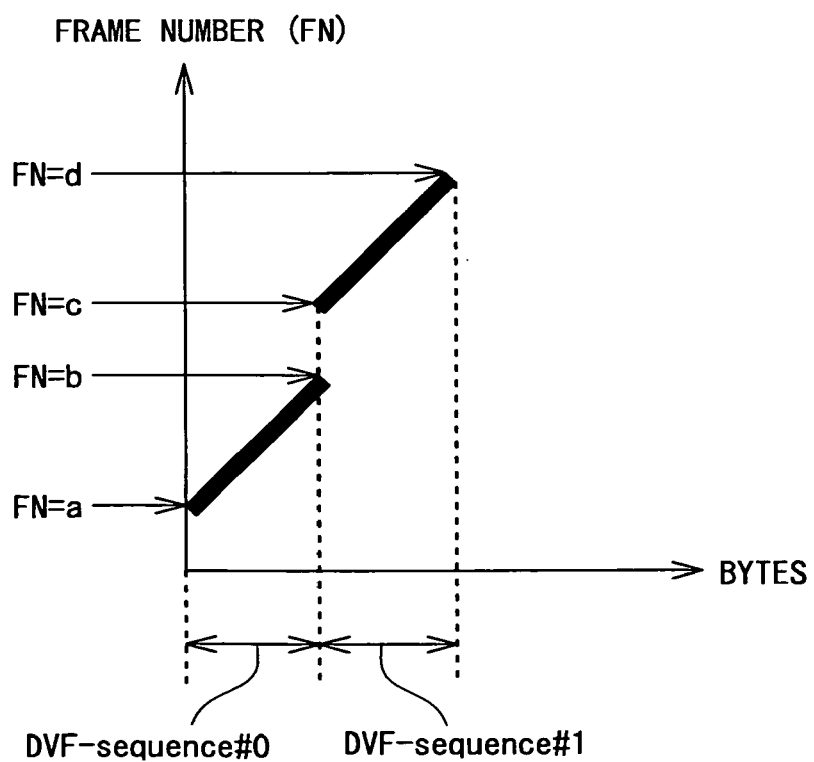
FIG. 18 is an explanatory diagram showing a relation between frame numbers and the DVF-sequences obtained as a result of an operation to delete a portion of the DVE sequence shown in FIG. 17.

FIG. 17 is a diagram showing a result of the an operation carried out to delete data of unnecessary reproduction sections from the DVF-sequence shown in FIG. 15, leaving a reproduction section starting with a frame having a frame number FN=a and ending with a frame having a frame number FN=b as well as a reproduction section starting with a frame having a frame number FN=c and ending with a frame having a frame number FN=d. If such an edit operation is carried out, 2 DVF-sequences are generated in Clip shown in FIG. 17. In the figure, DVF-sequence#0 is the first DVF-sequence and DVF-sequence#1 is the second DVF-sequence. The first DVF sequence includes data of frames of a reproduction section starting with a frame having a frame number FN=a and ending with a frame having a frame number FN=b. On the other hand, the second DVF sequence includes data of frames of a reproduction section starting with a frame having a frame number FN=c and ending with a frame having a frame number FN=d. FIG. 18 is a diagram showing the DVF-sequences shown in FIG. 17 and the frame numbers. In this case, the boundary between the 2 DVF-sequences is a point of discontinuity in the series of regularly increasing DV frame numbers. As shown in FIG. 17, DVF-sequence#0 includes pieces of data referred to as Leading_data_size#0 and Trailing_data_size#0 whereas DVF-sequence#1 includes pieces of data referred to as Leading_data_size#1 and Trailing_data_size#1.

The following description explains a method of making a random access to an arbitrary frame in the AV stream file by using information on the DVF-sequence for the file.

Figure 19:
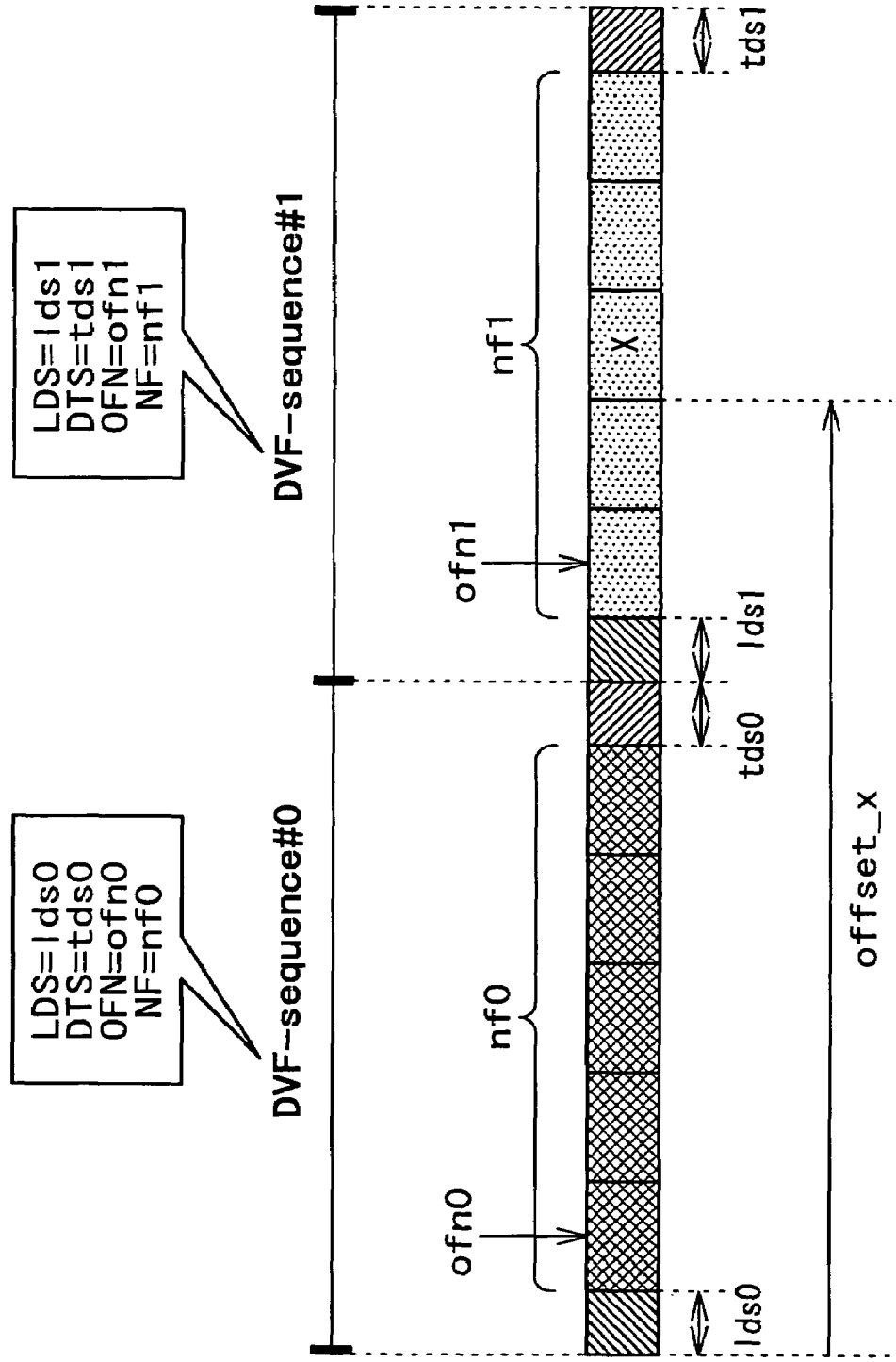
FIG. 19 is an explanatory diagram referred to in describing a random access to an arbitrary DV frame on the basis of a DVF-sequence information.

FIG. 19 is a diagram showing an AV stream file having 2 DVF-sequences. The following description explains a method of making a random access to an xth frame in the second DVF-sequence, that is, DVF-sequence#1 shown in the figure. In this case, in the AV stream file shown in FIG. 19, the number of bytes in an offset between the top of the file and the top of the xth frame is computed by using Eqs. 1 and 2 shown below. In the figure, the offset is denoted by notation offset_x.

$$\text{offset\_}x = DVF\_\text{sequence\_size}\ [0] + lds1 + (x - ofn1) \times FS \quad (1)$$

$$DVF\_\text{sequence\_size}\ [0] = lds0 + tds0 + nf0 \times FS \quad (2)$$

where notation DVF_sequence_size [0] denotes the number of bytes in the first DVF-sequence, that is, DVF-sequence#0, notation lds0 denotes Leading_data_size of DVF-sequence#0, notation tds0 denotes Trailing_data_size of DVF-sequence#0, notation nf0 denotes the number of DV frames in DVF-sequence#0, notation FS denotes the number of bytes in 1 DV frame, notation lds1 denotes Leading_data_size of DVF-sequence#1 and notation ofn1 is the offset frame number assigned to the first complete frame in DVF-sequence#1. In the case of the SD-DVCR of the 525-60 system, the number of bytes in 1 DV frame is 120,000.

FIG. 20 is a diagram showing the syntax of Sequence Info ( ). Num_of_DVF_sequences is the number of DFV-sequences included in the AV stream file.

Offset_FN_DVF [dvf_id] is the offset frame number assigned to the first DV frame in a DVF-sequence referenced by a DVF-sequence ID denoted by notation dvf_id as one of DVF-sequences included in the AV stream file.

Leading_data_size [dvf_id] is the number of bytes in data preceding the first DV frame in a DVF-sequence referenced by dvf_id.

Trailing_data_size [dvf_id] is the number of bytes in data succeeding the last DV frame in a DVF-sequence referenced by dvf_id.

Number_of_frames [dvf_id] is the number of frames referenced in a DVF-sequence indicated by dvf_id. The frames included in a DVF-sequence is frames included in a reproduction section, which begins with the first DV frame and ends with the last DV frame.

The values of Offset_FN_DVF [dvf_id] in Sequence Info ( ) are regularly increasing numbers satisfying conditions expressed by Eqs. (3) and (4) as follows:

$$\text{Offset\_FN\_DVF [dvf\_id]} \geq 0 \quad (3)$$

For dvf_id satisfying 0<dvf_id<num_of_DVF_sequences, $$\text{Offset\_FN\_DVF [dvf\_id]} > \text{Offset\_FN\_DVF [dvf\_id-1]} + \text{Number\_of\_frames [dvf\_id-1]} \quad (4)$$

Next, a relation between the DVF-sequence and PlayList is explained below. The explained relation between the DVF-sequence and PlayList is a relation obtained as a result of an operation to partially delete data of a Clip AV stream in typically an editing process as described above.

Figure 21:
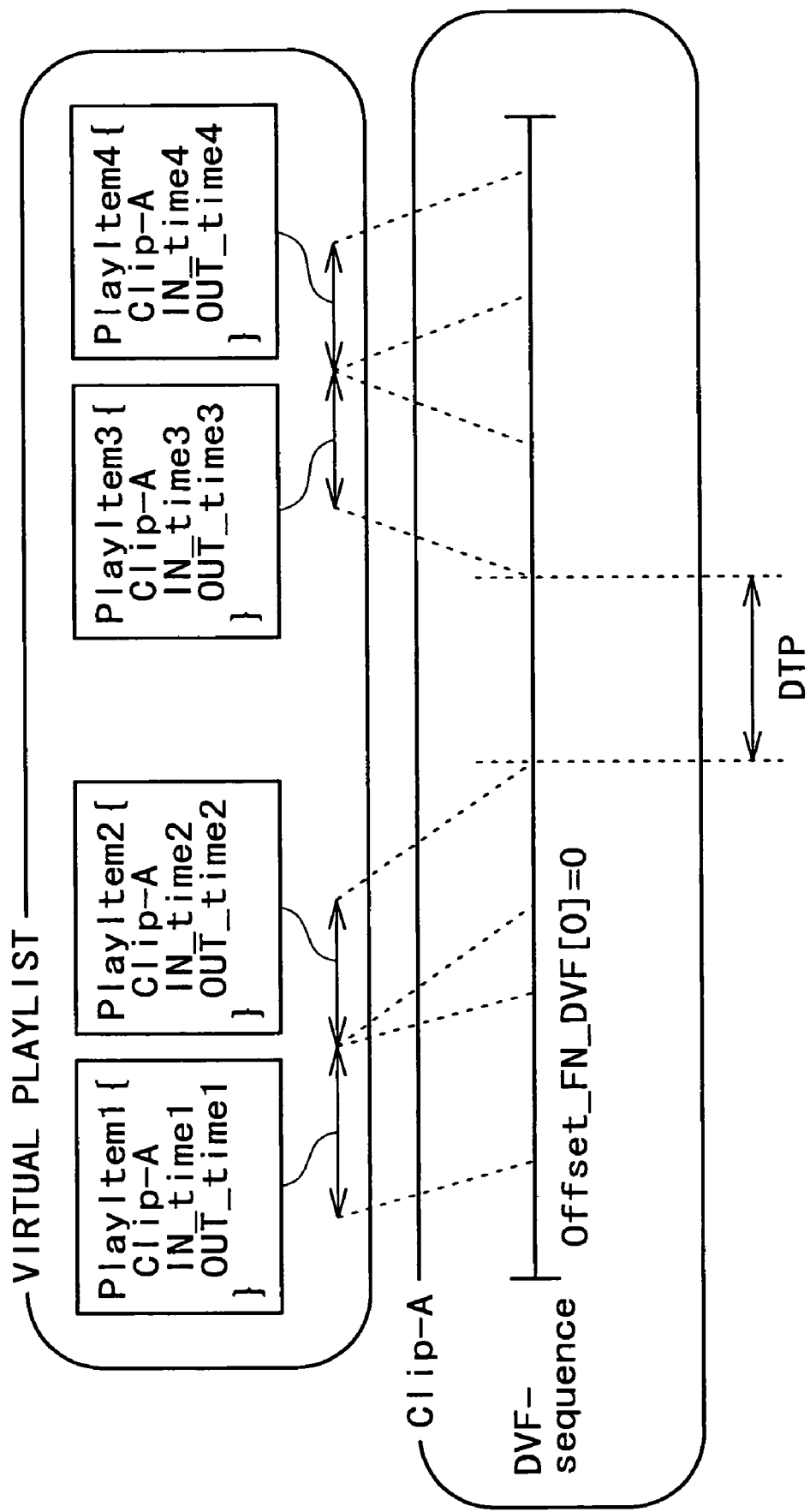
FIG. 21 is an explanatory diagram showing a relation between Clip and PlayList as a relation resulting from an operation to delete a portion from a Clip AV stream.

Consider a case in which a portion DTP is deleted from a Clip AV stream having one DVF-sequence as shown in FIG. 21. As shown in FIG. 21, Offset_FN_DVF [0] of the DVF-sequence prior to the editing work is 0. As described above, Offset_FN_DVF [0] is the offset frame number assigned to the first frame in the DVF-sequence. PlayItem1, PlayItem2, PlayItem3 and PlayItem4, which are included in Virtual PlayList, reference this DVF-sequence. Let the AV stream data be deleted from the DVF-sequence. The deleted the AV stream data is not referenced by any of PlayItem1, PlayItem2, PlayItem3 and PlayItem4 as shown in FIG. 21.

Figure 22:
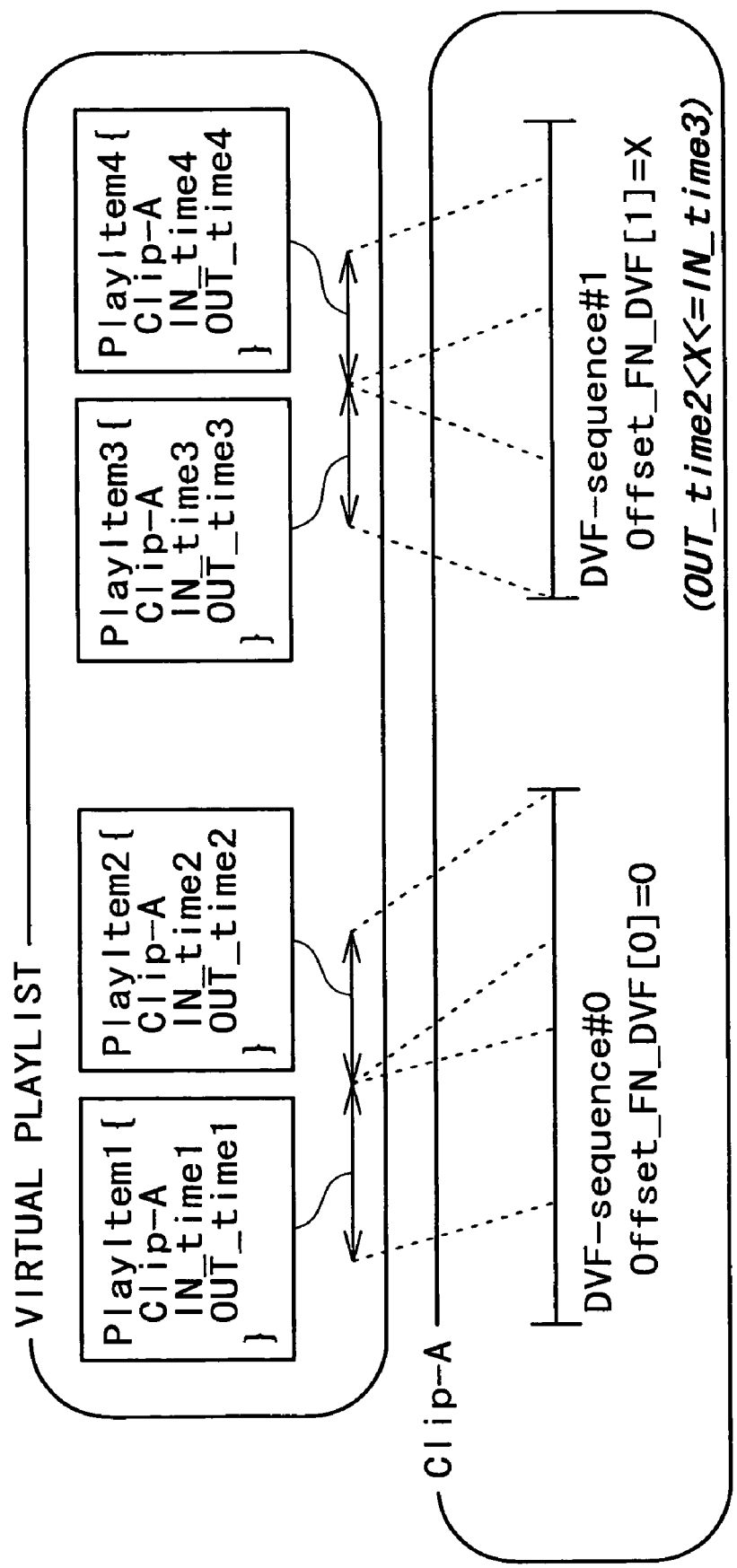
FIG. 22 is an explanatory diagram showing a relation between Clip and PlayList as a relation resulting from an operation to delete a selected portion from a Clip AV stream as shown in FIG. 21.

As a result of the operation to delete the portion DTP from the Clip AV stream shown in FIG. 21 in an editing work, the DVF-sequence is split into DVF-sequence#0 and DVF-sequence#1 as shown in FIG. 22. As described above, Clip after the editing work has two DVF-sequences. Offset_FN_DVF [0] of the first DVF-sequence is set at 0 and Offset_FN_DVF [1] of the second DVF-sequence is set at a value X. The value X is greater than OUT_time2 but smaller than or equal to IN_time 3. Thus, it is not necessary to change the values of IN_time3 and OUT_time3 of PlayItem3 in PlayList. By the same token, it is not necessary to change the values of IN_time4 and OUT_time4 of PlayItem4 in PlayList. In this way, when partial data of a Clip AV stream is deleted, it is not necessary to make a change to Virtual PlayList not using the deleted partial data.

In an operation carried out by a reproduction unit to reproduce PlayItem in PlayList, the reproduction unit is capable of finding a DVF-sequence pointed to by IN_time and OUT_time, which are included in PlayItem, by comparing IN_time with Offset_FN_DVF of each DVF-sequence. In the case of PlayList shown in FIG. 22, for example, IN_time3 of PlayItem3 is found greater than or equal to Offset_FN_DVF(=X) of the second DVF-sequence has been set. Thus, the second DVF-sequence is known as a sequence pointed to by IN_time3 and OUT_time3, which are included in PlayItem3.

Next, ProgramInfo ( ) is explained.

Figure 23:
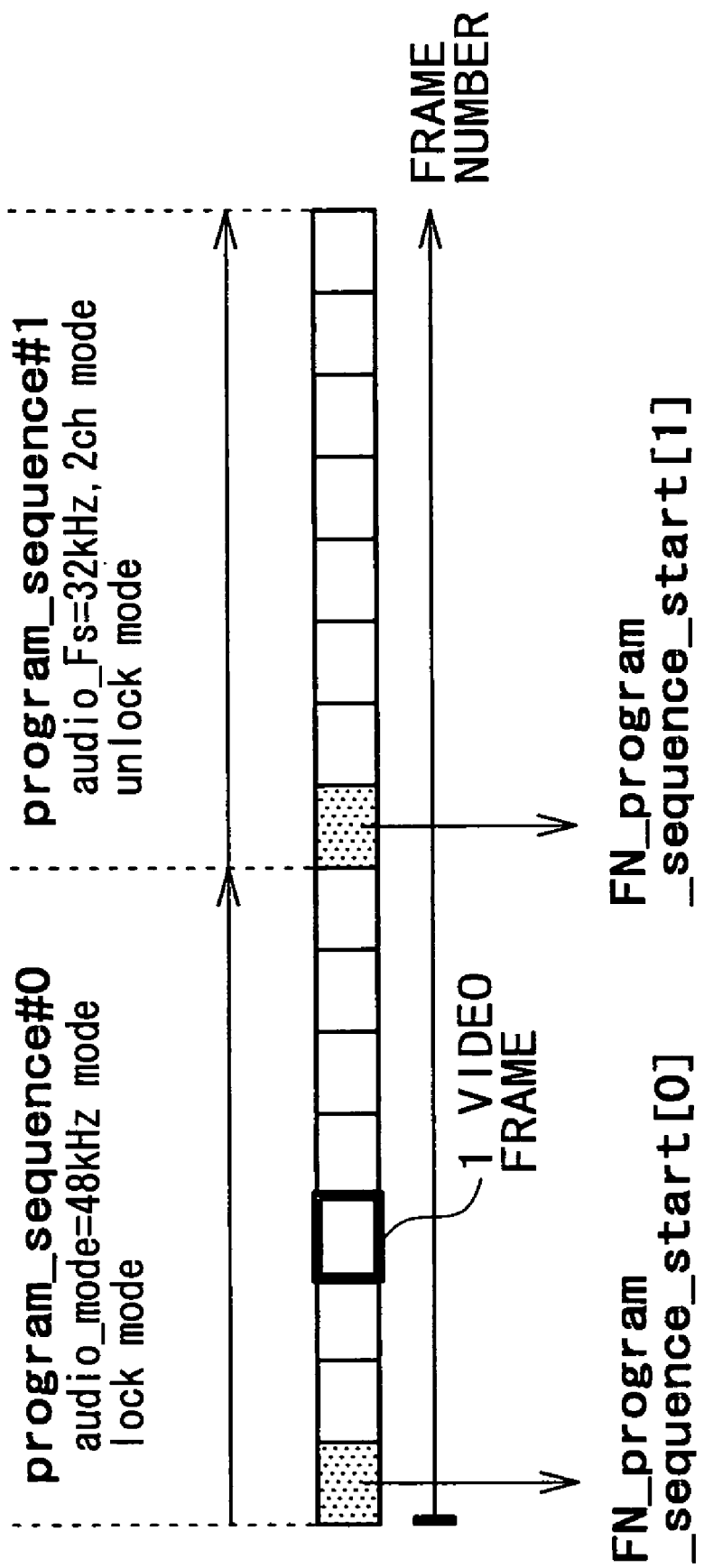
FIG. 23 is an explanation diagram showing a program-sequence.

A program-sequence in an AV stream file is an array of frames in which the contents of a program prescribed in this format are fixed. FIG. 23 is an explanatory diagram used for describing a program-sequence.

A frame number assigned to a frame at the beginning of a new program-sequence in an AV stream file is stored in ProgramInfo ( ). This frame number is denoted by FN_program_sequence_start.

In an AV stream file, all program-sequences other than the last program-sequence each begin with a frame pointed to by FN_program_sequence_start and end with a frame immediately preceding a frame indicated by next FN_program_sequence_start. The last program-sequence begins with a frame indicated by SPN_program_sequence_start and ends with the last frame of the AV stream file. In the case of the example shown in FIG. 23, the AV stream file comprises 2 program-sequences, namely, program-sequence #0 and program-sequence #1. A program-sequence may be spread over DVF-sequences, crossing boundaries between the DVF-sequences.

FIG. 24 is a diagram showing the syntax of Program Info ( ). num_of_program_sequences is the number of program-sequences included in the AV stream file.

FN_program_sequence_start [pgm_id] is a frame number assigned to a DV frame at the beginning of a program-sequence in an AV stream file.

Values of FN_program_sequence_start included in ProgramInfo ( ) are regularly increasing numbers.

audio_mode [pgm_id] is the audio mode of the DV signal. The mode can be a 48 kHz mode, a 44.1 kHz mode or a 32 kHz-2CH mode.

lock_flag [pgm_id] is a flag indicating whether or not the video and audio signals are locked.

Figure 25:
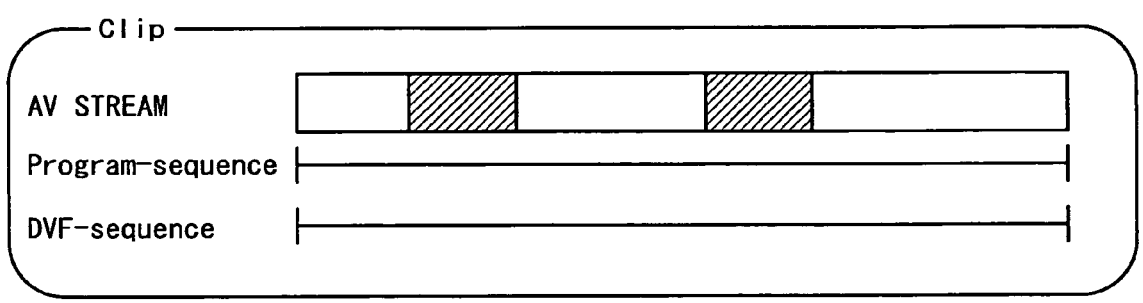
FIG. 25 is an explanation diagram showing a relation between a DVF-sequence and a program-sequence prior to deletion of partial data of a Clip AV stream.
Figure 26:
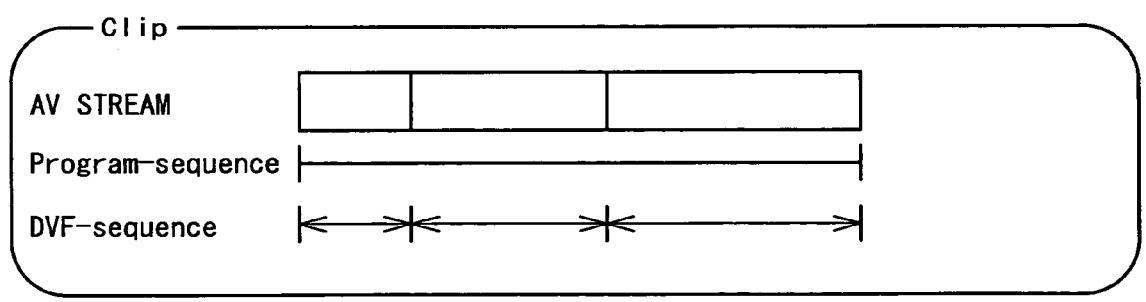
FIG. 26 is a diagram showing a relation between DVF-sequences and a program-sequence obtained as a result of an operation to delete partial data from the Clip AV stream shown in FIG. 25.

FIG. 25 is a diagram showing data of one Clip AV stream. In this example, the Clip AV stream has one program-sequence and one DVF-sequence. The contents of the program-sequence do not change. FIG. 26 is a diagram showing data of the Clip AV stream. The data is a result of an operation to delete portions each indicated by a hatched block from the data of the Clip AV stream shown in FIG. 25 in an editing work. Clip shown in FIG. 26 has 3 DVF-sequences but the program-sequence remains as a single program-sequence as it is. In this case, the program-sequence is spread over the DVF-sequences, crossing boundaries between the DVF-sequences.

Figure 27:
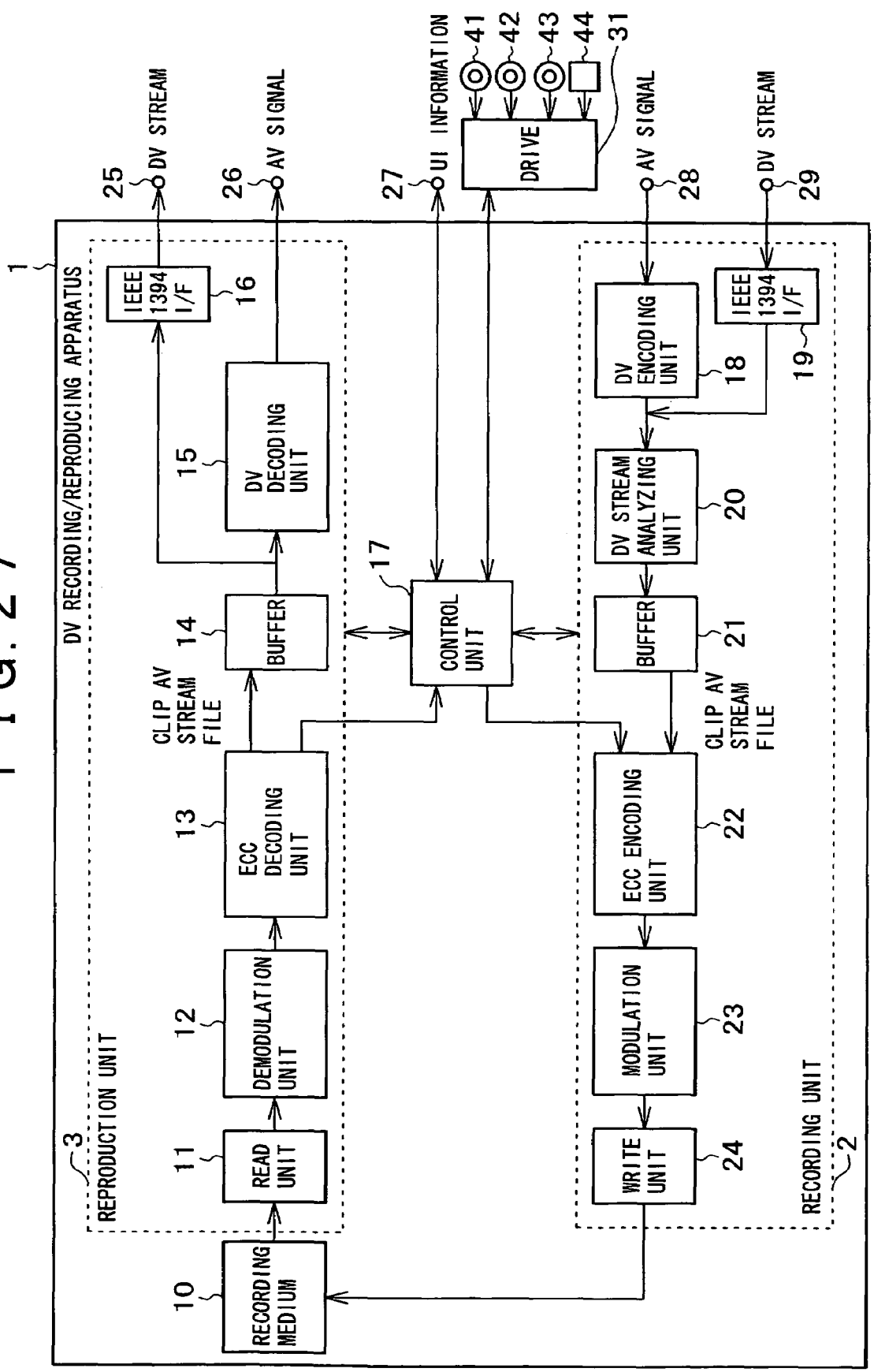
FIG. 27 is a block diagram showing a typical configuration of a DV recording/reproducing apparatus provided by the present invention.

By referring to FIG. 27, the following description explains a recording/reproducing system for recording and reproducing data having a DVR application structure. FIG. 27 is a block diagram showing a typical configuration of a DV recording/reproducing apparatus 1. The DV recording/reproducing apparatus 1 comprises a recording unit 2 for recording data and a reproduction unit 3 for reproducing data.

First of all, a recording operation is explained.

An AV signal received from a terminal 28 is encoded in a DV encoding unit 18 to obtain a DV stream. As an alternative, a DV stream is obtained from a terminal 29 by way of an IEEE 1394 I/F 19. A DV stream analyzing unit 20 analyzes the DV stream before temporarily storing the stream in a buffer 21. An ECC (Error-Correcting Code) encoding unit 22 adds ECC codes to the AV stream read out from the buffer 21 and then supplies the AV stream including the additional ECC codes to a modulation unit 23, which modulates the stream and then outputs a result of the modulation to a write unit 24. The write unit 24 then records an AV stream file onto a recording medium 10 in accordance with a control signal generated by a control unit 17.

The DV recording/reproducing apparatus 1 stores not only an AV stream file onto the recording medium 10 as described above, but also application database information related to the file. The application database information is generated in the control unit 17 on the basis of input information received by the control unit 17 from the DV stream analyzing unit 20 and in accordance with an input command received from a terminal 27.

The information received from the DV stream analyzing unit 20 includes the type (DV_format_type) of the DV signal, the number of input DV frames and program information. The number of frames at the end of the operation to record the DV stream onto the recording medium 10 is the number of frames (Number_of_frames) included in a DVF-sequence. Information on changes in program contents included in the AV stream is data stored in ProgramInfo. The information received from the DV stream analyzing unit 20 is stored in a database (Clip information) of the AV stream.

A command received from the terminal 27 includes information specifying a reproduction section in the AV stream, a string of characters explaining the contents of the reproduction section, a bookmark to be set in a scene specified by the user and a timestamp corresponding to a resume point in the AV stream. These pieces of information included in the command entered by the user are stored in the database of PlayList.

On the basis of the input information described above, the control unit 17 generates a database (Clip information) of the AV stream, a database of PlayList and management information (info.dvr) for data being recorded onto the recording medium 10. These pieces of database information are subjected to the processes carried out by the ECC encoding unit 22 and the modulation unit 23 in the same way as the AV stream before being supplied to the write unit 24. The write unit 24 then stores database files onto the recording medium 10 in accordance with a control signal received from the control unit 17.

Next, a reproducing operation is explained.

On the recording medium 10, an AV stream file and application database information have been recorded.

First of all, the control unit 17 issues a request to a read unit 11 to read out application database information from the recording medium 10. At this request, the read unit 11 reads out the application database information from the recording medium 10. The read unit 11 supplies the application database information to a demodulation unit 12, which then demodulates the information. The demodulation unit 12 supplies demodulated information to an ECC (Error-Correcting Code) decoding unit 13, which then carries out an error correction process on the information. The ECC encoding unit 13 then supplies a result of the error correction process to the control unit 17.

The control unit 17 outputs a list of PlayList objects based on the application database to a user interface by way of a terminal 27. The user interface lets the user select PlayList to be reproduced from the list of PlayList objects. When the control unit 17 receives information on PlayList selected by the user, the control unit 17 issues a request to the read unit 11 to read out an AV stream file required in reproduction of selected PlayList from the recording medium 10. At this request, the read unit 11 reads out the AV stream file from the recording medium 10. After being subjected to the processes carried out by the demodulation unit 12 and the ECC encoding unit 13, a reproduced DV stream file is supplied to a buffer 14.

The control unit 17 then executes control so as to read out a stream comprising DV frames for a reproduction section (PlayItem) of the AV stream from the buffer 14. The data of the DV frames read out from the buffer 14 is then supplied to a DV decoding unit 15. The DV decoding unit 15 decodes the data of the DV frames and outputs a reproduced AV signal to a terminal 26. In addition, the data of the DV frames read out from the buffer 14 is also output to a terminal 25 as a DV stream by way of an IEEE 1394 I/F 16.

Next, a process to edit an AV stream is explained.

When the user specifies a reproduction section of an AV stream recorded on the recording medium 10, creating a new reproduction path, the IN and OUT points of a reproduction section are extracted from a UI (User Interface) input received from the terminal 27 and are then supplied to the control unit 17. The control unit 17 then creates a database of PlayList to be used as a group of reproduction sections (PlayItem objects) of an AV stream.

When the user requires to delete a portion of an AV stream recorded on the recording medium 10, information on the portion to be deleted is extracted from an UI input received from the terminal 27 and is then supplied to the control unit 17. Then, the control unit 17 changes the database of PlayList so that only necessary portions of the AV stream are referenced. Then, the control unit 17 issues a request to the write unit 24 to delete the unnecessary portion of the AV stream. The contents of the Clip information file are also updated to reflect the change in the Clip AV stream.

Figure 28:
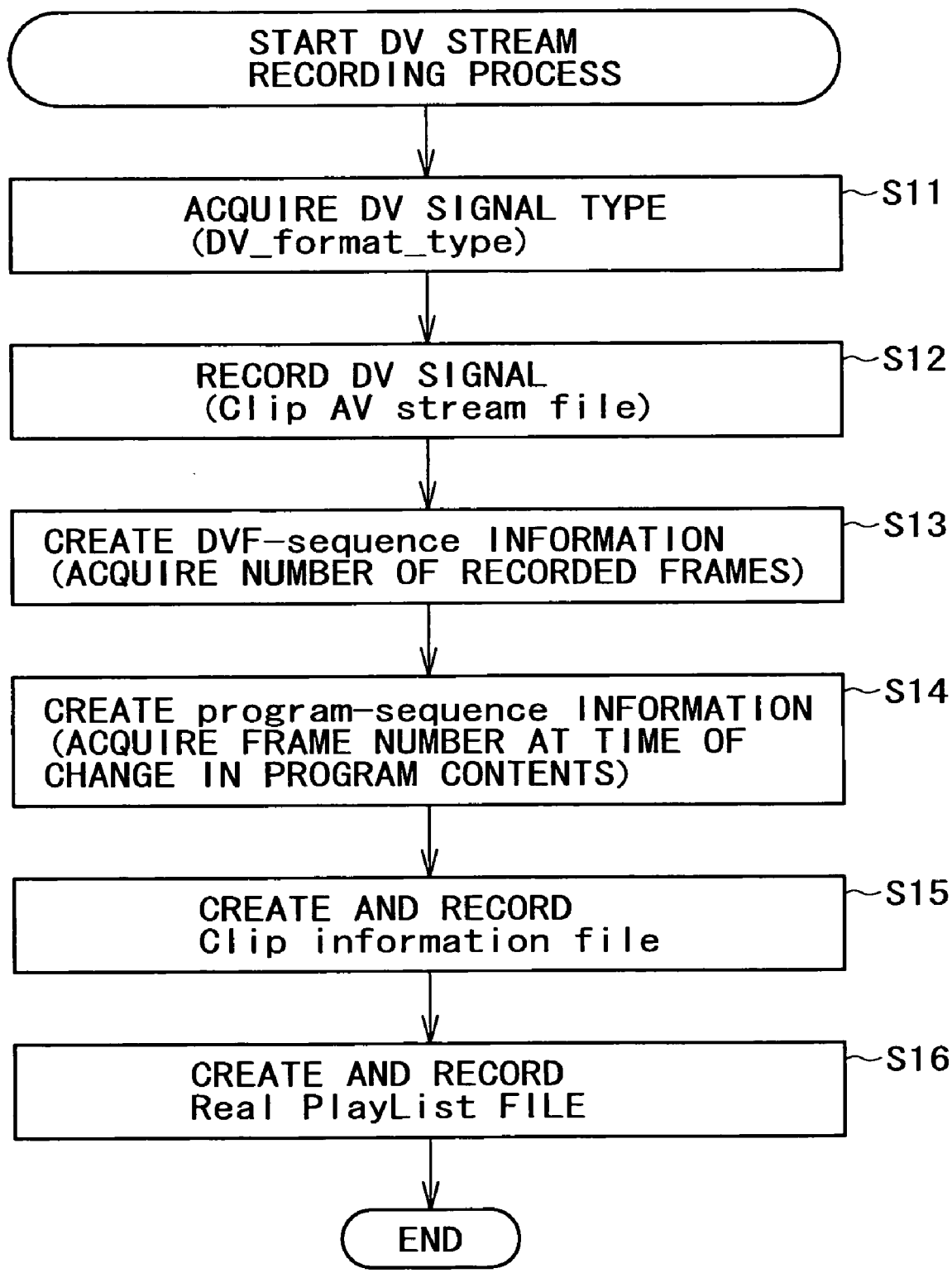
FIG. 28 shows a flowchart representing a process to record a DV stream.

By referring to a flowchart shown in FIG. 28, the following description explains a process to newly record a DV stream onto the recording medium 10. It is to be noted that execution of this recording process is started when the user operates a UI (User Interface) connected to the terminal 27 to enter a command for starting the process.

At a step S11, the control unit 17 acquires the type (DV_format_type) of a DV signal from the DV stream analyzing unit 20. As described earlier, DV_format_type may indicate an SD-DVCR 525-60 system with a byte count of 120,000 bytes, an SD-DVCR 625-50 system with a byte count of 144,000 bytes, an SDL-DVCR 525-60 system with a byte count of 60,000 bytes or an SDL-DVCR 625-50 system with a byte count of 72,000 bytes.

Then, at the next step S12, the control unit 17 controls the write unit 24 to record the Clip AV stream file onto the recording medium 10.

Subsequently, at the next step S13, the control unit 17 creates DVF-sequence information. The total number of recorded frames is acquired from the DV stream analyzing unit 20. In the present case, a DVF-sequence is created with Offset_FN_DVF=0, Leading_data_size=0 and Trailing_data_size=0. The control unit 17 then sets the total number of recorded frames acquired from the DV stream analyzing unit 20 as Number_of_frames.

Then, at the next step S14, the control unit 17 creates program-sequence information. To put it concretely, the control unit 17 acquires a frame number at the time of change in program contents is made. The frame number is stored in ProgramInfo. In the case of the example shown in FIG. 23, there are 2 program-sequences, namely, program-sequence #0 and program-sequence #1. In the case of the example shown in FIG. 26, on the other hand, there is only 1 program-sequence.

Subsequently, at the next step S15, the control unit 17 creates a Clip information file for the Clip AV stream file recorded onto the recording medium 10 at the step S12 and records the Clip information file onto the recording medium 10. As described earlier by referring to FIG. 7, the Clip information file is a database file for managing time-base information along the AV stream and data contained in the Clip AV stream file.

Then, at the next step S16, the control unit 17 creates a Real PlayList file covering the entire reproduction range of Clip and records the file onto the recording medium 10. As described earlier by referring to FIG. 3, Real PlayList specifies an access point in Clip mainly as a timestamp.

Figure 29:
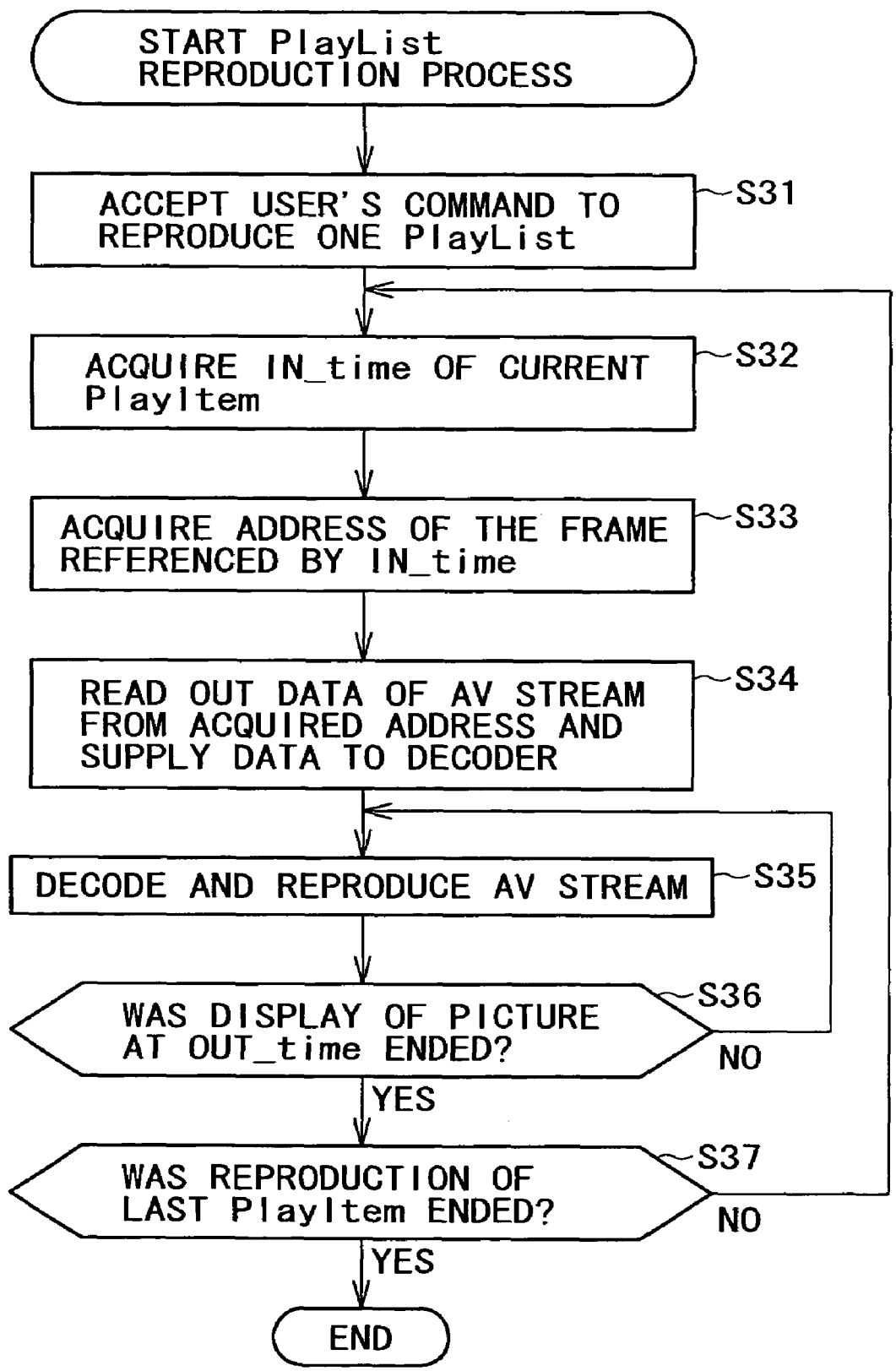
FIG. 29 shows a flowchart representing a process to reproduce PlayList.

Next, a process to reproduce PlayList is explained by referring to a flowchart shown in FIG. 29. It is to be noted that the execution of this process is started when the user enters a command to reproduce PlayList.

At a step S31, the control unit 17 receives a command entered by the user to reproduce PlayList.

Then, at the next step S32, the control unit 17 acquires IN_time of present PlayItem. If the command received at the step S31 is a command to reproduce PlayList for a DVF-sequence of Clip A like the one shown in FIG. 21, for example, the control unit 17 acquires IN_time1 of present PlayItem1.

Subsequently, at the next step S33, the control unit 17 acquires the address of a frame referenced by IN_time. The processing carried out at this step is explained in detail as follows.

First of all, the control unit 17 compares IN_time with Offset_FN_DVF of each of N DVF-sequences. Offset_FN_DVF of each of N DVF-sequences is included in SequenceInfo of Clip referenced by IN_time. (In the case of the example shown in FIG. 21, IN_time is IN_time1 and Clip is Clip A). Then, the control unit 17 finds a minimum k that has a value in the range 0≦k<N and satisfies Eq. (5) as follows.

$$\text{Offset\_FN\_DVF}[k] < \text{IN\_time} \quad (5)$$

A frame referenced by IN_time is included in the kth DVF-sequence of Clip. By using Eqs. (6) and (7) given below, the control unit 17 then computes the address of a predetermined frame in the AV stream file as the address of the frame referenced by IN_time. The address of the perdetermined frame referenced by IN_time is the number of bytes between the beginning of the AV stream file and the perdetermined frame.

$$\text{offset\_IN\_frame} = \text{offset\_sum} + \text{Leading\_data\_size}[k] + (\text{IN\_frame} - \text{Offset\_FN\_DVF}[k]) \times FS \quad (6)$$

$$\text{offset\_sum} = \sum_{i=0}^{k-1} (\text{Leading\_data\_size}[i] + \text{number\_of\_frames}[i] \times FS + \text{Trailing\_data\_size}[i]) \quad (7)$$

Then, at the next step S34, the control unit 17 controls the read unit 11 to read out data of the AV stream from the address computed at the step S33 and supply the data to the DV decoding unit 15.

Subsequently, at the next step S35, the control unit 17 drives the DV decoding unit 15 to decode and reproduce the AV stream.

Then, at the next step S36, the control unit 17 determines as to whether or not the processing to reproduce a frame referenced by OUT_time (in the case of the example shown in FIG. 21, OUT_time1) has been completed. If the outcome of the determination indicates that the processing to reproduce the frame referenced by OUT_time has not been completed, the flow of the process goes back to the step S35 to repeat the process from the step.

If the outcome of the determination at the step S36 indicates that the processing to reproduce the frame referenced by OUT_time (in the case of the example shown in FIG. 21, OUT_time1) has been completed, the flow of the process goes on to a step S37 at which the control unit 17 determines as to whether or not the processing to reproduce last PlayItem (in the case of the example shown in FIG. 21, PlayItem4) has been completed. If the outcome of the judgment indicates that the processing to reproduce last PlayItem has not been completed, the flow of the process goes back to the step S32 to repeat the process from the step.

If the outcome of the determination at the step S37 indicates that the processing to reproduce last PlayItem has been completed, the execution of this process is ended.

Figure 30:
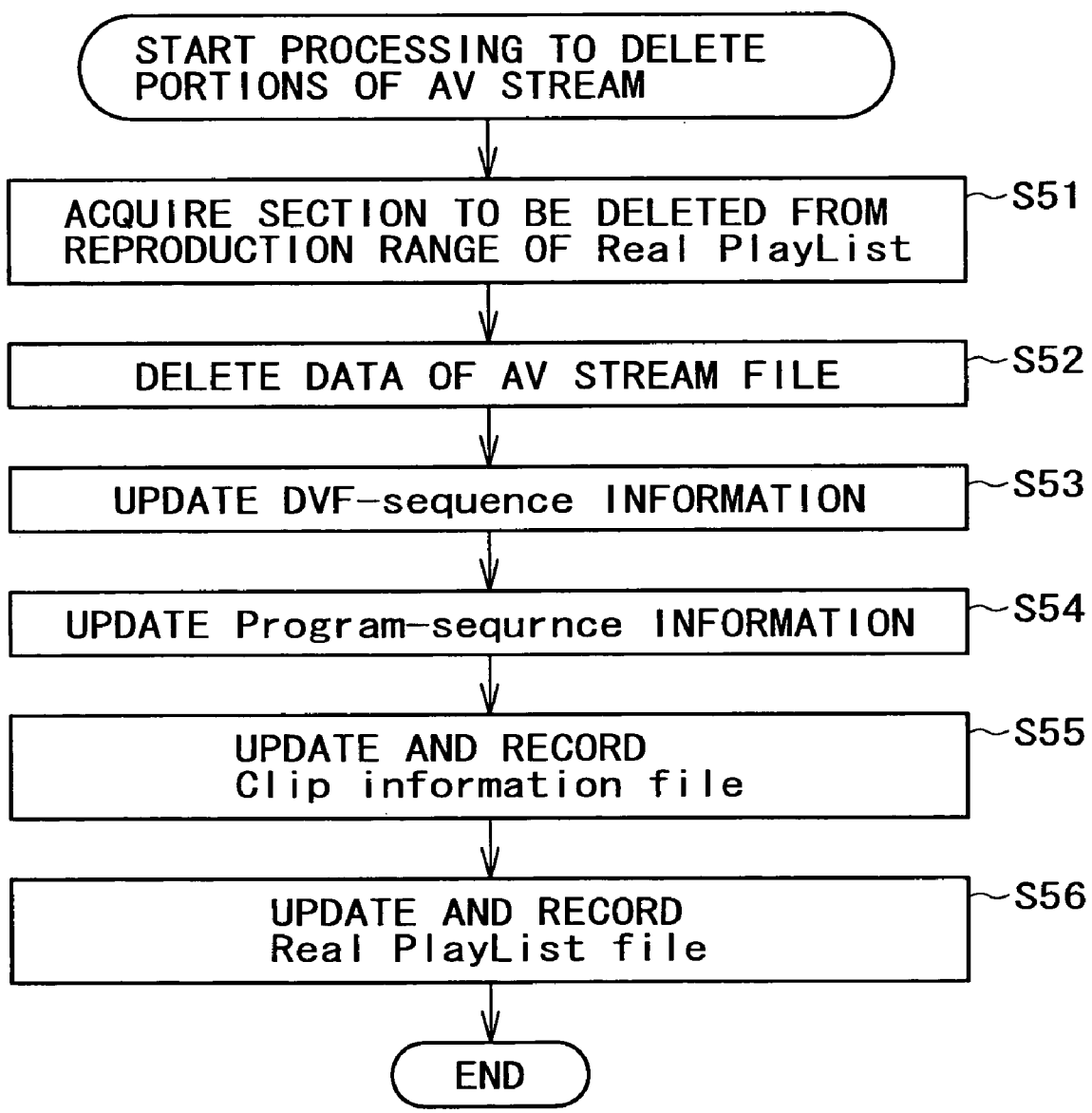
FIG. 30 shows a flowchart representing a process to delete partial data from an AV stream file.

Next, a process to delete portions of an AV stream file is explained by referring to a flowchart shown in FIG. 30. It is to be noted that the execution of this process is started when the user enters a command to delete portions of an AV stream file.

At a step S51, the control unit 17 acquires sections to be deleted from a reproduction range of Real Playlist. In the case shown in FIG. 15, for example, an operation is carried out to delete data of unnecessary reproduction sections, leaving a reproduction section starting with a frame having a frame number FN=a and ending with a frame having a frame number FN=b as well as a reproduction section starting with a frame having a frame number FN=c and ending with a frame having a frame number FN=d. Thus, in this case, the control unit 17 acquires reproduction sections which are neither the reproduction section starting with a frame having a frame number FN=a and ending with a frame having a frame number FN=b nor the reproduction section starting with a frame having a frame number FN=c and ending with a frame having a frame number FN=d.

Then, at the next step S52, the control unit 17 deletes the AV stream data of Clip referenced by the acquired reproduction sections to be deleted. In the case of the example shown in FIG. 15, the control unit 17 deletes the AV stream data of Clip referenced by the reproduction section DTA to be deleted.

Subsequently, at the next step S53, the control unit 17 updates the DVF-sequence information to reflect an AV stream file obtained as a result of the deletion of the data. In the case of the example shown in FIG. 15, as a result of the processing to delete some data from the AV stream, the DVF-sequence is split into DVF-sequence#0 and DVF-sequence#1 as shown in FIG. 17. Thus, the control unit 17 updates Offset_FN_DVF, Num_of_frames Leading_data_size and Trailing_data_size, which are included in DVF-sequence information shown in FIG. 19.

The pieces of processing carried out at the steps S52 and S53 are explained more in detail as follows. As an example, consider a case in which an operation is carried out to delete data from the reproduction range of a DVF-sequence except a section starting with a frame indicated by a certain frame number and ending with a frame indicated by another certain frame.

In the first place, assume that data preceding a frame indicated by a frame number x is deleted from the DVF-sequence having parameters expressed by Eqs. (8) to (11) as follows.

$$\text{Offset\_FN\_DVF}=ofn \tag{8}$$

$$\text{Number\_of\_frames}=nf \tag{9}$$

$$\text{Leading\_data\_size}=lds \tag{10}$$

$$\text{Trailing\_data\_size}=tds \tag{11}$$

As the data preceding the frame indicated by the frame number x is deleted from the DVF-sequence, the parameters are changed to those expressed by Eqs. (12) to (15) respectively as follows.

$$\text{Offset\_FN\_DVF}=x \tag{12}$$

$$\text{Number\_of\_frames}=nf-(x-ofn) \tag{13}$$

$$\text{Leading\_data\_size}=\text{offset\_x} \% \text{SECTOR\_SIZE} \tag{14}$$

$$\text{Trailing\_data\_size}=tds \tag{15}$$

where symbol % is an operator for finding a division remainder.

Notation SECTOR_SIZE denotes the number of bytes composing a sector. A typical value of SECTOR_SIZE is 2,048. Notation offset_x denotes the number of bytes existing between the beginning of the DVF-sequence and a frame indicated by the frame number x. The value of offset_x is computed by using Eq. (16) as follows.

$$\text{offset\_}x=lds+(x-ofn)\times FS \tag{16}$$

where notation FS is the number of bytes included in a frame.

The number of sectors containing the deleted data starting from the beginning of the DVF-sequence is expressed by the following expression: offset_x/SECTOR_SIZE.

In the second place, assume that data succeeding a frame indicated by a frame number y is deleted from the DVF-sequence having parameters expressed by Eqs. (17) to (20) as follows.

$$\text{Offset\_FN\_DVF}=ofn \tag{17}$$

$$\text{Number\_of\_frames}=nf \tag{18}$$

$$\text{Leading\_data\_size}=lds \tag{19}$$

$$\text{Trailing\_data\_size}=tds \tag{20}$$

As the data succeeding the frame indicated by the frame number y is deleted from the DVF-sequence, the parameters are changed to those expressed by Eqs. (21) to (23) as follows.

$$\text{Offset\_FN\_DVF}=ofn \tag{21}$$

$$\text{Number\_of\_frames}=y-ofn \tag{22}$$

$$\text{Leading\_data\_size}=lds \tag{23}$$

Trailing_data_size is computed as follows. First of all, offset_y, which denotes the number of bytes existing between the beginning of the DVF-sequence and a frame indicated by the frame number y, is computed by using Eqs. (24) to (27) as follows.

$$\text{offset\_}y=lds+(y-ofn)\times FS \tag{24}$$

$$\text{tmp}=\text{offset\_y} \% \text{SECTOR\_SIZE} \tag{25}$$

$$\text{For } tmp\neq 0, \text{Trailing\_data\_size}=\text{SECTOR\_SIZE}-tmp \tag{26}$$

$$\text{For tmp=0, Trailing\_data\_size}=0 \tag{27}$$

Then, a portion starting with ((offset_y+Trailing_data_size)/(SECTOR_SIZE)th sector and ending with the last sector is deleted from the DVF-sequence.

Subsequently, at the next step S54, the control unit 17 updates the program-sequence information. Take a DVF-sequence with Offset_FN_DVF=ofn as an example. In this case, after data preceding a frame indicated by the frame number x is deleted, the program-sequence information is updated in accordance with Eq. (29) provided that a condition expressed by Eq. (28) is satisfied.

$$ofn \leq \text{FN\_program\_sequence\_start} \leq x \tag{28}$$

$$\text{FN\_program\_sequence\_start}=x \tag{29}$$

Then, at the next step S55, the control unit 17 updates the Clip information file to reflect results of the processing carried out at the steps S53 and S54, recording the updated Clip information file.

Subsequently, at the next step S56, the control unit 17 updates the Real PlayList file to reflect changes in reproduction range, which have been made at the step S51, and stores the updated Real PlayList file.

By using such syntaxes, data structures and rules as a basis, it is possible to properly manage contents of data, reproduction information and the like, which are stored on the recording medium 10. In addition, in a reproducing operation, the user is capable of properly verifying contents of data recorded on the recording medium 10 and reproducing desired data from any arbitrary location in the recording medium 10 at a high speed and with a high degree of reliability.

In the embodiment described above, a DV stream is taken as an example of the AV stream. It is to be noted, however, that the example of the AV stream is not limited to a DV stream. The present invention can be applied to any other stream as long as the number of bytes composing each video frame of the other stream is fixed. In addition, data can be recorded, deleted and reproduced onto and from a disc in units other than sectors.

Furthermore, in the description with reference to FIG. 12, a DVF-sequence is defined as an array of bytes composing DV frames having regularly increasing frame numbers assigned thereto. However, the definition can also be changed to an array of DV bytes composing frames with regularly increasing reproduction times. In this case, in order to obtain a reproduction-time resolution corresponding to a frequency of 90 kHz, the reproduction time is expressed as a value obtained by multiplying the frame number by 3,003, which is a number for the 525-60 system. In the case, in order to convert the frame number shown in FIG. 11 into the reproduction time, the value is obtained by multiplying the frame number by 3,003, which is a number for the 525-60 system. In addition, the axis representing the frame number in FIGS. 12, 16 and 18 is replaced by an axis representing the reproduction time.

Moreover, Offset_FN_DVF in the syntax of SequenceInfo, FN_program_sequence_start of ProgramInfo as well as IN_time and OUT_time in the syntax of PlayItem may be expressed by a reproduction time in place of a frame number. By the same token, in order to obtain a reproduction-time resolution corresponding to a frequency of 90 kHz, the reproduction time is expressed as a value obtained by multiplying the frame number by 3,003, which is a number for the 525-60 system.

In this case, consider an operation to make a random access to the xth frame of the second DVF-sequence shown in FIG. 19, that is, DVF-sequence #1 shown in the figure. In this operation, IN_time is the reproduction start time of the xth frame to which an access is made. At a reproduction-time resolution corresponding to a frequency of 90 kHz, the offset expressed by Eq. (1) is changed to an offset expressed by Eq. (1A) as follows:

$$\text{offset}\_x = DVF\_\text{sequence\_size } [0] + lds1 + ((\text{time}\_x - \text{time}\_ofn1)/FT) \times FS \quad (1A)$$

where notation time_x denotes the reproduction start time of the xth frame, notation time_ofn1 denotes an offset reproduction start time of a frame array including the xth frame and notation FT denotes the reproduction time of one frame. In the case of the 525-60 system, FT has a value of 3,003.

In addition, in place of Offset_FN_DVF and Number_of_frames, which are described in the syntax of SequenceInfo, a reproduction frame number (=Offset_FN_DVF) and a reproduction end frame number (=Offset_FN_DVF+Number_of_Frams−1) may be used.

In the operation to make a random access to the xth frame of the second DVF-sequence shown in FIG. 19, that is, DVF-sequence #1 shown in the figure, for example, the number of frames (nf) is computed by subtracting a reproduction start frame number (Offset_FN_DVF) from a reproduction end frame number (Offset_FN_DVF+Number_of_frames−1). Then, the number of frames (nf) is used in finding the location of the xth frame in accordance with Eqs. (1) and (2). In this case, the nf value is obtained with Eq. (30) given below.

$$nf = (\text{Offset}\_FN\_DVF + \text{Number\_of\_frames} - 1) - (\text{Offset}\_FN\_DVF) + 1 \quad (30)$$

Furthermore, data included in portions indicated by Leading_data_size and Trailing_data_size is not limited to data of an incomplete frame. Instead, data included in such portions may be any kind of data. For example, data of a complete DV frame or database information may be included in the portions.

That is to say, while the amount of data included in a leading portion in the sector of a DVF-sequence is the length of data not pertaining to this DVF-sequence as shown in FIG. 14, the present invention is not limited to this scheme. For example, the amount of data included in the leading portion may exceed the length of one sector as shown in FIG. 31. This flexibility is also applicable to the amount of data included in a trailing portion.

For a sector size of 2,048 bytes, the amount of data included in the leading portion and the amount of data included in the trailing portion can be limited to the following value.

The amount of data included in the leading portion is limited to a multiple of 64 bytes for the SD-DVCR 525-60 system or a multiple of 128 bytes for the SD-DVCR 625-50 system. By the same token, the amount of data included in the trailing portion is limited to a multiple of 64 bytes for the SD-DVCR 525-60 system or a multiple of 128 bytes for the SD-DVCR 625-50 system. In this case, the number 64 is the greatest common divisor of a sector size of 2,048 bytes and a DV frame size of 120,000 bytes for the SD-DVCR 525-60 system. On the other hand, the number 128 is the greatest common divisor of a sector size of 2,048 bytes and a DV frame size of 144,000 bytes for the SD-DVCR 625-50 system.

It is to be noted that, in accordance with the DV encoding method, an inter-frame differential encoding process is not carried out. This is because all frames are each regarded as an intra frame, which is a frame to be subjected to an intra-frame encoding process. Thus, a DV stream can be cut or connected to another DV stream on a frame boundary without losing decoding continuities.

In addition, in the embodiment described above, information is managed by using Clip information files separated from each other and PlayList files also separated from each other. However, the Clip information files can be combined into a single file. By the same token, the PlayList files can be combined into a single file. For example, it is possible to manage objects each representing SequenceInfo ( ) by using a single file. Furthermore, it is not always necessary to manage data by using files. That is to say, the file system is not absolutely indispensable to management of data. Thus, data can be managed in any format if the format is manageable to a moving-picture recording/reproducing apparatus.

As described above, in a system for recording a stream with video frames having a fixed byte count such as a DV stream onto a recording medium taking a logical sector as its minimum data-recording unit and reproducing the stream, information of a DV frame array (or DVF-sequence) comprising frames with regularly increasing frame numbers or reproduction times is recorded. To put it concretely, the recorded information includes an offset frame number (Offset_FN_DVF) or offset reproduction start time of the first DV frame of the DVF-sequence in the recorded DV stream. In addition, the recording medium also includes the number of DV frames (Number_of_frames) included in the DVF-sequence.

When a DV stream is newly recorded onto a recording medium, for example, a continuously recorded DV frame array does not include a point of discontinuity in the series of regularly increasing frame numbers or reproduction times, and only one DFV-sequence exists. This DVF-sequence starts with the first frame of the DV frame array.

Consider a case in which a process such as an editing work causes data of an unnecessary reproduction section to be deleted from the DV frame array and puts together all the remaining data in a new single data file. In this case, in the new data file, a plurality of DVF-sequences can exist. With a plurality of DVF-sequences existing in the data file, an offset frame number or offset reproduction start time of each DVF-sequence to be reproduced as the first DV frame for the DVF-sequence is also recorded onto the recording medium. In addition, Leading_data_size, Trailing_data_size and Number_of_frames are also recorded onto the recording medium for each of the DVF-sequences. As described earlier, Leading_data_size for a DVF-sequence is the number of bytes in data preceding a DV frame to be reproduced as the first DV frame for the DVF-sequence. On the other hand, Trailing_data_size for a DVF-sequence is the number of bytes in data succeeding a DV frame to be reproduced as the last DV frame for the DVF-sequence. Number_of_frames for a DVF-sequence is the number of frames included in the DVF-sequence.

Moreover, in a system recording DVF-sequence information on a recording medium, a point of a change in program contents of a DV stream is detected, and information (program-sequence) of a DV frame array having continuous program contents is recorded on the recording medium. To put it concretely, a reproduction start time or a frame number assigned to a DV frame at which the program-sequence starts in a recorded DV stream is recorded onto the recording medium. The program-sequence may be spread over a plurality of DVF-sequences, crossing boundaries of the DVF-sequences.

Thus, it is possible to correctly manage the address of a DV frame at the beginning of each DV frame array having a series of regularly increasing frame numbers or reproduction times in a recorded DV stream. Since the number of Clip files does not increase even if the number of DVF-sequences rises, the files can be managed with ease.

In addition, since each DVF-sequence is identified by using Offset_FN_DVF, it is easy to search DVF-sequences for a specific one referenced by PlayItem. (For clarity, refer to FIG. 22).

Furthermore, even if the AV stream file includes a point of discontinuity in the series of regularly increasing DV frame numbers or regularly increasing reproduction times, the reproduction start and end times of the AV data can be managed properly. Since a target reproduction start time in a file can be found with ease in a reproduction process based on a random access, it is possible to implement the reproduction process based on a random access as a reproduction process having a fast response to an input entered by the user.

Moreover, while the IEEE 1394 I/F is used in the embodiment described above as a digital interface, it is needless to say that another interface such as the USB can also be adopted as well.

The series of processes described above can be carried out by using hardware or software. If the series of processes is to be carried out by using software, programs composing the software are installed in a computer embedded in special-purpose hardware or another computer such as a general-purpose personal computer from a program storage medium.

The program storage medium from which the programs composing the software are to be installed is package media distributed to users separately from the computer to present the programs to the users. Examples of the package media containing the programs are a magnetic disc 41 including a floppy disc, an optical disc 42 including a CD-ROM (Compact Disc-Read Only Memory) and a DVD (Digital Versatile Disc), a magneto-optical disc 43 including an MD (Mini Disc,) and a semiconductor memory 44, which are shown in FIG. 27. Instead of installing the programs from the package media, the programs can also be stored in advance in either of a ROM and a hard disc, which are components embedded in the computer. In this way, the programs are presented to the user in a state of being embedded in the computer in advance. It is to be noted that the embedded ROM and the embedded hard disc themselves are shown in none of the figures.

It is needless to say that, in the description, steps prescribing a computer program of course represent processes to be carried out in an order the steps are described along the time base. It is to be noted, however, that the steps do not necessarily represent such sequential processes. Instead, the steps may represent processes including those to be carried out concurrently or individually.

In addition, the term "system" used in the description means an entire apparatus combination comprising a plurality of apparatus.

INDUSTRIAL APPLICABILITY

As described above, according to the present invention, even after data recorded on an information-recording medium is edited, a reproduction position can be identified. In addition, the reproduction position can be identified fast and with a high degree of reliability.

The invention claimed is:

1. A data-recording apparatus for recording video data onto an information-recording medium, comprising:
   a control unit for:
   assigning frame array identification information to each of frame arrays each comprising successive frames in time;
   acquiring leading-data representing the length of data located at the beginning of said frame array as a part not belonging to said frame array;
   acquiring trailing-data information for each of said frame arrays representing the length of data located at the end of said frame array as a part not belonging to said frame array;
   acquiring first information for each of said frame arrays for identifying a frame located at the beginning of said frame array; and
   acquiring second information for each of said frame arrays representing the number of frames included in said frame array; and
   a recording unit for recording said leading-data information, said trailing-data information, said first information and said second information along with said frame array identification information into said information-recording medium by associating said leading-data information, said trailing-data information, said first information and said second information with said frame array identification information.

2. The data-recording apparatus according to claim 1, wherein the beginning of said leading-data information and the end of said trailing-data information each coincide with a sector boundary.

3. The data-recording apparatus according to claim 2, wherein said video data is data obtained as a result of an intra-frame encoding process carried out on all said frames.

4. The data-recording apparatus according to claim 2, wherein said video data is video data with all said frames thereof having a uniform amount of data.

5. The data-recording apparatus according to claim 2, wherein said successive frames in time are frames having regularly increasing frame numbers assigned thereto.

6. The data-recording apparatus according to claim 2, wherein said successive frames in time are frames having regularly increasing reproduction times.

7. The data-recording apparatus according to claim 2, wherein said first information is an offset number representing a frame number assigned to a frame located at the beginning of said frame array and said second information is the number of frames included in said frame array.

8. The data-recording apparatus according to claim 2, wherein said first information is a reproduction start frame number representing a frame number assigned to a frame located at the beginning of said frame array and said second information is a reproduction end frame number representing a frame number assigned to a frame located at the end of said frame array.

9. The data-recording apparatus according to claim 2, wherein said first information is an offset reproduction start time representing a frame located at the beginning of said frame array and said second information is an offset reproduction end time representing a frame located at the end of said frame array.

10. A data-recording method adopted by a data-recording apparatus for recording video data onto an information-recording medium, comprising:
    assigning frame array identification information to each of frame arrays each comprising successive frames in time;
    generating leading-data information for each of said frame arrays representing the length of data located at the beginning of said frame array as a part not belonging to said frame array;
    generating trailing-data information for each of said frame arrays representing the length of data located at the end of said frame array as a part not belonging to said frame array;
    detecting first information for each of said frame arrays for identifying a frame located at the beginning of said frame array;
    computing second information for each of said frame arrays representing the number of frames included in said frame array; and
    recording said leading-data information, said trailing-data information, said first information and said second information along with said frame array identification information into said information-recording medium by associating said leading-data information, said trailing-data information, said first information and said second information with said frame array identification information.

11. A data reproducing apparatus for reproducing video data recorded on an information-recording medium, comprising:
    a reproduction unit for reproducing pieces of information from said information-recording medium including:
        frame array identification information for identifying each frame array comprising successive frames in time;
        leading-data information representing the length of data located at the beginning of said frame array as a part not belonging to said frame array;
        trailing-data information representing the length of data located at the end of said frame array as a part not belonging to said frame array;
        first information for identifying a frame located at the beginning of said frame array; and
        second information representing the number of frames included in said frame array; and
    a control unit for controlling a reproduction position of a specified frame on the basis of said frame array identification information, said leading-data information, said trailing-data information, said first information and said second information.

12. The data reproducing apparatus according to claim 11, wherein the beginning of said leading-data information and the end of said trailing-data information each coincide with a sector boundary.

13. The data reproducing apparatus according to claim 11, wherein said successive frames in time are frames having regularly increasing frame numbers assigned thereto.

14. The data reproducing apparatus according to claim 11, wherein said successive frames in time are frames having regularly increasing reproduction times.

15. The data reproducing apparatus according to claim 11, wherein said first information is an offset number representing a frame number assigned to a frame located at the beginning of said frame array and said second information is the number of frames included in said frame array.

16. The data reproducing apparatus according to claim 15, wherein an amount of data included in said frames is uniform for all said frames and said control unit computes said reproduction position of said specified frame by executing:
    computing a difference between a specified-frame identification number used for specifying said specified frame and said offset number of a specific frame array including said specified frame;
    multiplying said difference by said uniform amount of data in order to result in a product; and
    adding said product to a sum of said leading-data information for said specific frame array and the amount of data included in a previous frame array immediately preceding said specific frame array on a time base in order to result in said reproduction position.

17. The data reproducing apparatus according to claim 16, wherein said control unit computes said amount of data included in said previous frame array immediately preceding said specific frame array on a time base by executing:
    multiplying said uniform amount of data by said number of frames included in said previous frame array in order to result in a product; and
    adding said product to a sum of said leading-data information of said previous frame array and said trailing-data information of said previous frame array in order to result in said amount of data included in said previous frame array.

18. The data reproducing apparatus according to claim 11, wherein said first information is a reproduction start frame number representing a frame number assigned to a frame located at the beginning of said frame array and said second information is a reproduction end frame number representing a frame number assigned to a frame located at the end of said frame array.

19. The data reproducing apparatus according to claim 18, wherein the amount of data included in any of said frames is uniform for all said frames and said control unit computes said reproduction position of said specified frame by executing:
    computing a difference between a specified-frame identification number used for specifying said specified frame and said reproduction start frame number of a specific frame array including said specified frame;
    multiplying said difference by said uniform amount of data in order to result in a product; and adding said product to a sum of said leading-data information for said specific frame array and the amount of data included in a previous frame array immediately preceding said specific frame array on a time base in order to result in said reproduction position.

20. The data reproducing apparatus according to claim 19, wherein said control unit computes said amount of data included in said previous frame array immediately preceding said specific frame array on a time base by executing:
    computing a difference between said reproduction end frame number of said previous frame array and said reproduction start frame number of said previous frame array in order to result in the number of frames included in said previous frame array;
    multiplying said uniform amount of data by said difference in order to result in a product; and
    adding said product to a sum of said leading-data information of said previous frame array and said trailing-data information of said previous frame array in order to result in said amount of data included in said previous frame array.

21. The data reproducing apparatus according to claim 11, wherein said first information is an offset reproduction start time representing a frame located at the beginning of said frame array and said second information is an offset reproduction end time representing a frame located at the end of said frame array.

22. The data reproducing apparatus according to claim 21, wherein the amount of data included in any of said frames is uniform for all said frames and said control unit computes said reproduction position of said specified frame by executing:
    computing a difference between a specified-frame identification number used for specifying said specified frame and said offset reproduction start time of a specific frame array including said specified frame;
    multiplying said difference by said uniform amount of data in order to result in a product; and
    adding said product to a sum of said leading-data information for said specific frame array and the amount of data included in a previous frame array immediately preceding said specific frame array on a time base in order to result in said reproduction position.

23. The data reproducing apparatus according to claim 22, wherein said control unit computes said amount of data included in said previous frame array immediately preceding said specific frame array on a time base by executing:
    computing a difference between said offset reproduction end time of said previous frame array and said offset reproduction start time of said previous frame array in order to result in the number of frames included in said previous frame array;
    multiplying said uniform amount of data by said difference in order to result in a product; and
    adding said product to a sum of said leading-data information of said previous frame array and said trailing-data information of said previous frame array in order to result in said amount of data included in said previous frame array.

24. A data reproducing method adopted by a data reproducing apparatus for reproducing video data recorded on an information-recording medium, comprising:
    reproducing, in a reproduction unit, frame array identification information for identifying each frame array comprising successive frames in time from said information-recording medium;
    reproducing, in the reproduction unit, leading-data information representing the length of data located at the beginning of said frame array as a part not belonging to said frame array from said information-recording medium;
    reproducing, in the reproduction unit, trailing-data information representing the length of data located at the end of said frame array as a part not belonging to said frame array from said information-recording medium;
    reproducing, in the reproduction unit, first information for identifying a frame located at the beginning of said frame array from said information-recording medium;
    reproducing, in the reproduction unit, second information representing the number of frames included in said frame array from said information-recording medium; and
    controlling, in a control unit, a reproduction position of a specified frame on the basis of said frame array identification information, said leading-data information, said trailing-data information, said first information and said second information.

* * * * *